United States Patent
Nesbitt

(10) Patent No.: US 10,697,785 B2
(45) Date of Patent: Jun. 30, 2020

(54) AUTOMATED ROUTE DETERMINATION

(71) Applicant: Verizon Patent and Licensing Inc., Basking Ridge, NJ (US)

(72) Inventor: David W. Nesbitt, Port Deposit, MD (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 14/182,227

(22) Filed: Feb. 17, 2014

(65) Prior Publication Data

US 2014/0163879 A1    Jun. 12, 2014

Related U.S. Application Data

(60) Continuation of application No. 13/946,884, filed on Jul. 19, 2013, now Pat. No. 8,655,583, which is a continuation of application No. 12/690,540, filed on Jan. 20, 2010, now Pat. No. 8,510,040, which is a division of application No. 10/259,788, filed on Sep. 30, 2002, now abandoned.

(60) Provisional application No. 60/406,629, filed on Aug. 29, 2002.

(51) Int. Cl.
G06F 19/00 (2018.01)
G01C 21/34 (2006.01)

(52) U.S. Cl.
CPC ......... *G01C 21/3453* (2013.01); *G01C 21/34* (2013.01); *G01C 21/3446* (2013.01)

(58) Field of Classification Search
CPC . G01C 21/3453; G01C 21/34; G01C 21/3446

USPC ....... 701/117, 533, 532, 410, 400, 538, 540, 701/541; 340/988, 990, 995, 995.19
See application file for complete search history.

(56) References Cited

U.S. PATENT DOCUMENTS

| | | |
|---|---|---|
| 4,812,990 A | 3/1989 | Adams et al. |
| 5,122,959 A | 6/1992 | Nathanson et al. |
| 5,122,961 A | 6/1992 | Toyama et al. |
| 5,179,519 A | 1/1993 | Adachi et al. |

(Continued)

FOREIGN PATENT DOCUMENTS

| | | |
|---|---|---|
| WO | 1999/017080 | 4/1999 |
| WO | WO 00/22593 | 4/2000 |
| WO | 2006/060340 | 6/2006 |

OTHER PUBLICATIONS

Bergholm et al., "Analysis of Current Approaches In Vision-Based Navigation," retrieved from http://72.14.203.104/search on Apr. 28, 2006.

(Continued)

*Primary Examiner* — Ronnie M Mancho

(57) ABSTRACT

A preferred route may be determined from an origin location to a destination location. The determination is made by processing directed links (e.g., one-way edges) in a graph that includes one or more links and two or more nodes. The determination of a preferred route may include an estimate of the time required at one or more intersections along alternative. Individual routing preferences, such as a preference of a rural over an urban route, also may be considered. Techniques are described that may help reduce the time required to identify a preferred route, including the identification and removal of no outlet routes before processing the directed links and techniques using particular data formats.

21 Claims, 10 Drawing Sheets

(56) References Cited

U.S. PATENT DOCUMENTS

| | | |
|---|---|---|
| 5,220,507 A | 6/1993 | Kirson |
| 5,243,528 A | 9/1993 | Lefebvre |
| 5,311,173 A | 5/1994 | Komura et al. |
| 5,481,604 A | 1/1996 | Minot |
| 5,504,482 A | 4/1996 | Schrader |
| 5,508,930 A | 4/1996 | Smith, Jr. |
| 5,513,110 A | 4/1996 | Fujita et al. |
| 5,559,707 A | 9/1996 | DeLorme et al. |
| 5,568,390 A | 10/1996 | Hirota et al. |
| 5,615,116 A | 3/1997 | Gudat et al. |
| 5,638,280 A | 6/1997 | Nishimura et al. |
| 5,712,788 A | 1/1998 | Liaw et al. |
| 5,752,217 A | 5/1998 | Ishizaki et al. |
| 5,757,289 A | 5/1998 | Nimura et al. |
| 5,787,271 A | 7/1998 | Box et al. |
| 5,797,106 A | 8/1998 | Murray et al. |
| 5,802,492 A | 9/1998 | DeLorme et al. |
| 5,848,373 A | 12/1998 | DeLorme et al. |
| 5,850,193 A | 12/1998 | Shimoura et al. |
| 5,854,899 A | 12/1998 | Callon et al. |
| 5,864,213 A | 3/1999 | Carlson |
| 5,893,081 A | 4/1999 | Poppen |
| 5,899,955 A * | 5/1999 | Yagyu et al. .................. 701/533 |
| 5,905,451 A | 5/1999 | Sakashita |
| 5,910,177 A | 6/1999 | Zuber |
| 5,911,773 A | 6/1999 | Mutsuga et al. |
| 5,916,299 A | 6/1999 | Poppen |
| 5,928,307 A | 7/1999 | Oshizawa et al. |
| 5,938,720 A | 8/1999 | Tamai |
| 5,948,040 A * | 9/1999 | DeLorme ............... G01C 21/36 340/990 |
| 5,974,419 A | 10/1999 | Ashby |
| 5,978,733 A | 11/1999 | Deshimaru et al. |
| 5,991,688 A * | 11/1999 | Fukushima et al. .......... 701/411 |
| 5,991,689 A | 11/1999 | Aito et al. |
| 6,016,485 A | 1/2000 | Amakawa et al. |
| 6,023,655 A | 2/2000 | Nomura |
| 6,038,509 A | 3/2000 | Poppen et al. |
| 6,038,559 A * | 3/2000 | Ashby et al. .................. 701/532 |
| 6,049,753 A | 4/2000 | Nimura |
| 6,072,409 A * | 6/2000 | Fushimi et al. ......... 340/995.19 |
| 6,098,016 A | 6/2000 | Ishihara |
| 6,119,066 A * | 9/2000 | Sugiura ............... G08G 1/0969 701/428 |
| 6,121,900 A | 9/2000 | Takishita |
| 6,122,593 A * | 9/2000 | Friederich ............... G01C 21/32 701/23 |
| 6,124,810 A | 9/2000 | Segal et al. |
| 6,128,574 A | 10/2000 | Diekhans |
| 6,144,318 A | 11/2000 | Hayashi et al. |
| 6,192,314 B1 * | 2/2001 | Khavakh ............... G01C 21/34 701/410 |
| 6,195,611 B1 | 2/2001 | Sakamoto et al. |
| 6,202,026 B1 | 3/2001 | Nimura et al. |
| 6,212,472 B1 * | 4/2001 | Nonaka ................. G01C 21/36 340/990 |
| 6,230,099 B1 | 5/2001 | Fabian |
| 6,246,957 B1 | 6/2001 | Barrer et al. |
| 6,249,742 B1 | 6/2001 | Friederich et al. |
| 6,256,295 B1 | 7/2001 | Callon |
| 6,259,988 B1 | 7/2001 | Galkowski et al. |
| 6,263,277 B1 | 7/2001 | Tanimoto et al. |
| 6,278,935 B1 * | 8/2001 | Kaplan ................. G01C 21/26 235/384 |
| 6,278,939 B1 | 8/2001 | Robare et al. |
| 6,278,942 B1 | 8/2001 | McDonough |
| 6,282,489 B1 | 8/2001 | Bellesfield et al. |
| 6,285,950 B1 | 9/2001 | Tanimoto |
| 6,289,277 B1 | 9/2001 | Feyereisen et al. |
| 6,292,743 B1 | 9/2001 | Pu et al. |
| 6,292,745 B1 | 9/2001 | Robare et al. |
| 6,317,685 B1 | 11/2001 | Kozak et al. |
| 6,318,274 B1 | 11/2001 | Park |
| 6,321,158 B1 | 11/2001 | DeLorme et al. |
| 6,324,470 B1 | 11/2001 | White |
| 6,338,021 B1 | 1/2002 | Yagyu et al. |
| 6,349,261 B1 | 2/2002 | Ohnishi et al. |
| 6,351,707 B1 | 2/2002 | Ichikawa |
| 6,356,911 B1 | 3/2002 | Shibuya |
| 6,397,145 B1 | 5/2002 | Millington |
| 6,401,027 B1 | 6/2002 | Xu et al. |
| 6,418,398 B1 | 7/2002 | Dueck et al. |
| 6,421,606 B1 | 7/2002 | Asai et al. |
| 6,424,355 B2 | 7/2002 | Watanabe et al. |
| 6,424,910 B1 | 7/2002 | Ohler et al. |
| 6,424,912 B1 | 7/2002 | Correia et al. |
| 6,427,119 B1 | 7/2002 | Stefan et al. |
| 6,430,501 B1 | 8/2002 | Slominski |
| 6,434,484 B1 | 8/2002 | Lee |
| 6,438,561 B1 | 8/2002 | Israni et al. |
| 6,446,110 B1 | 9/2002 | Lection et al. |
| 6,456,933 B1 | 9/2002 | Hessing |
| 6,456,935 B1 | 9/2002 | Ng |
| 6,463,384 B1 | 10/2002 | Kaplan et al. |
| 6,526,335 B1 | 2/2003 | Treyz et al. |
| 6,529,821 B2 | 3/2003 | Tomasi et al. |
| 6,564,224 B1 | 5/2003 | Wu et al. |
| 6,574,553 B1 | 6/2003 | Beesley et al. |
| 6,577,937 B1 | 6/2003 | Shuman et al. |
| 6,591,188 B1 | 7/2003 | Ohler |
| 6,601,073 B1 | 7/2003 | Robare |
| 6,609,063 B1 * | 8/2003 | Bender .................. G01C 21/32 340/995.19 |
| 6,647,336 B1 | 11/2003 | Iwata |
| 6,671,615 B1 | 12/2003 | Becker et al. |
| 6,691,128 B2 | 2/2004 | Natesan et al. |
| 6,704,645 B1 | 3/2004 | Beesley et al. |
| 6,708,110 B2 | 3/2004 | Stefan et al. |
| 6,725,156 B2 | 4/2004 | Kaplan |
| 6,728,630 B1 | 4/2004 | Burt et al. |
| 6,785,608 B1 | 8/2004 | Milici et al. |
| 6,922,633 B2 | 7/2005 | Takenaka |
| 6,947,837 B2 | 9/2005 | Fukushima et al. |
| 6,993,430 B1 | 1/2006 | Bellesfield et al. |
| 6,996,469 B2 | 2/2006 | Lau et al. |
| 7,079,945 B1 | 7/2006 | Kaplan |
| 7,082,443 B1 | 7/2006 | Ashby |
| 7,089,264 B1 | 8/2006 | Guido et al. |
| 7,092,964 B1 | 8/2006 | Dougherty et al. |
| 7,095,964 B2 | 8/2006 | Koyama et al. |
| 7,133,771 B1 | 11/2006 | Nesbitt |
| 7,260,474 B1 | 8/2007 | Thayathil et al. |
| 7,321,824 B1 | 1/2008 | Nesbitt |
| 7,356,405 B1 | 4/2008 | Nesbit |
| 7,474,960 B1 | 1/2009 | Nesbitt |
| 8,249,810 B2 | 8/2012 | Jones |
| 8,392,457 B1 | 3/2013 | Bender et al. |
| 8,560,223 B2 | 10/2013 | Nesbitt |
| 8,649,975 B2 | 2/2014 | Nesbitt |
| 9,097,543 B2 | 8/2015 | Kato et al. |
| 2001/0020213 A1 | 9/2001 | Hatano |
| 2001/0021895 A1 | 9/2001 | Yamazaki |
| 2001/0047241 A1 | 11/2001 | Khavakh et al. |
| 2001/0056325 A1 | 12/2001 | Pu et al. |
| 2002/0011941 A1 | 1/2002 | Endo et al. |
| 2002/0062190 A1 * | 5/2002 | Hameleers ............... G08G 1/09 701/117 |
| 2002/0077745 A1 | 6/2002 | Ohmura et al. |
| 2002/0087262 A1 | 7/2002 | Bullock et al. |
| 2002/0120620 A1 * | 8/2002 | Chan ................ G06F 17/30433 |
| 2002/0156572 A1 | 10/2002 | Bullock et al. |
| 2002/0161513 A1 | 10/2002 | Bechtolsheim et al. |
| 2002/0169778 A1 * | 11/2002 | Natesan .................. G01C 21/32 |
| 2002/0183922 A1 | 12/2002 | Tomasi et al. |
| 2003/0036848 A1 | 2/2003 | Sheha et al. |
| 2003/0046000 A1 | 3/2003 | Morita et al. |
| 2003/0060973 A1 | 3/2003 | Mathews et al. |
| 2003/0065805 A1 | 4/2003 | Barnes, Jr. |
| 2003/0093219 A1 | 5/2003 | Schultz et al. |
| 2003/0120423 A1 | 6/2003 | Cochlovius et al. |
| 2003/0142808 A1 | 7/2003 | Hollman et al. |
| 2003/0182052 A1 | 9/2003 | DeLorme et al. |
| 2004/0012505 A1 | 1/2004 | Yokota |

(56) References Cited

U.S. PATENT DOCUMENTS

| | | |
|---|---|---|
| 2004/0042405 A1 | 3/2004 | Nesbitt |
| 2004/0044465 A1 | 3/2004 | Nesbitt et al. |
| 2004/0044466 A1 | 3/2004 | Nesbitt |
| 2004/0052239 A1 | 3/2004 | Nesbitt |
| 2004/0176907 A1 | 9/2004 | Nesbitt |
| 2005/0021541 A1 | 1/2005 | Rangadass et al. |
| 2006/0168117 A1 | 7/2006 | Paparella et al. |
| 2007/0091868 A1 | 4/2007 | Hollman et al. |
| 2008/0114535 A1 | 5/2008 | Nesbitt |
| 2008/0147313 A1 | 6/2008 | Nesbitt |
| 2012/0209524 A1 | 8/2012 | Okude et al. |
| 2013/0297207 A1 | 11/2013 | Mason et al. |
| 2014/0309789 A1 | 10/2014 | Ricci |

OTHER PUBLICATIONS

Deiss, "Garmin GPS Feature Comparisons and Upgrade Information," Apr. 7, 2006.

Bertino, et al., "Navigational accesses in a temporal object model", Knowledge and Data Engineering, IEEE Transactions on, vol. 10, Issue 4, Jul.-Aug. 1998, pp. 656-665, Digital Object Identifier 10.1109/69.706062.

Chen, et al., "Reliable pre-trip multi-path planning and dynamic adaptation for a centralized road navigation system", Intelligent Transportation Systems, 2005 Proceedings, 2005 IEEE, Sep. 13-15, 2005, pp. 257-262, Digital Object Identifier 10.1109/ITSC.2005.1520057.

Edelkamp, et al., "Geometric travel planning", Intelligent Transportation Systems, IEEE Transactions on vol. 6, Issue I, Mar. 2005, pp. 5-16, Digital Object Identifier 10.1109/TITS.2004.838182.

Fleischman, "Research and Evaluation Plans for the TravTek IVHS Operational Field Test", General Motors Research Labs, Operating Sciences Dept., Vehicle Navigation and Information Systems Conference, 1991, vol. 2, pp. 827-837.

Guzolek, et al., "Real-time Route Planning in Road Networks", Vehicle Navigation and Information Systems Conference, 1989. Conference Record Toronto, Ontario, Canada, Sep. 11-13, 1989, New York, NY, USA, IEEE, US, Sep. 11, 1989, pp. 165-169, XP010034444, ISBN: 0-9692316-2-8.

Haigron, et al., "Depth-map-based scene analysis for active navigation in virtual angioscopy", Medical Imaging, IEEE Transactions on, vol. 23, Issue 11, Nov. 2004, pp. 1380-1390, Digital Object Identifier 10.1109/TMI.2004.836869.

Lankenau, et al., "A versatile and safe mobility assistant", Robotics & Automation Magazine, IEEE, vol. 8, Issue 1, Mar. 2001, pp. 29-37, Digital Object Identifier 10.1109/100.924355.

Meng, et al., "A novel ad hoc routing protocol research based on mobility prediction algorithm", Wireless Communications, Networking and Mobile Computing, 2005, Proceedings, 2005 International Conference on vol. 2, Sep. 23-26, 2005, pp. 791-794, Digital Object Identifier 10.1109/WCNM.2005.1544171.

Nelson, et al., "Vehicle-Based Route Planning in Advanced Traveler Information Systems", Intelligent Vehicles '93 Symposium, Tokyo, Japan, Jul. 14-16, 1993, New York, NY, USA, IEEE, US, Jul. 14, 1993, pp. 152-156, XP010117308, ISBN: 0-7803-1370-4.

Singh, et al., "Introduction to Data Structures", West Publishing of Minnesota, 1985, 11 pgs.

Snyder, et al., "Map Projections-A Working Manual", U.S. Geological Survey Professional Paper 1395, U.S. Department of the Interior, 1987, 394 pgs.

Valavanis, et al., "A case study of fuzzy-logic-based robot navigation", Robotics & Automation Magazine, IEEE, vol. 13, Issue 3, Sep. 2006, pp. 93-107, Digital Object Identifier 10.1109/MRA.2006.1678143.

Yang, et al., "Path planning and evaluation in IVHS databases", Vehicle Navigation and Information Systems Conference, 1991, vol. 2, Oct. 20-23, 1991, pp. 283-290.

Yum, et al., "QoS provisioning in clusters: an investigation of router and NIC design", in Computer Architecture, 2001, Proceedings, 28th Annual International Symposium on Jun. 30-Jul. 4, 2001, pp. 120-129, Digital Object Identifier 10.1109/ISCA.2001.937441.

\* cited by examiner

| 610 | 620 | 630 | 640 |
|---|---|---|---|
| Node Identifier | Directed Links | Driveable Link Count | Total Link Count |

| 710 | 720 | 730 | 740 | 750 | 760 | 770 |
|---|---|---|---|---|---|---|
| Directed Link Identifier | Speed | Distance | Enter-No-Outlet Indicator | Within-No-Outlet Indicator | Intersection cost for each directed Link-to-Link Transition | End Node Identifier |

AUTOMATED ROUTE DETERMINATION

CROSS REFERENCE TO RELATED APPLICATIONS

This application continuation of and claims the benefit of priority to U.S. patent application Ser. No. 13/946,884, filed Jul. 19, 2013 (now allowed), which is a continuation of and claims the benefit of priority to U.S. patent application Ser. No. 12/690,540, filed Jan. 20, 2010 (now issued as U.S. Pat. No. 8,510,040), which is a divisional of U.S. patent application Ser. No. 10/259,788, filed Sep. 30, 2002 (now abandoned), which claims the benefit of priority to U.S. Provisional Patent Application No. 60/406,629, filed Aug. 29, 2002. The contents of the above-referenced applications are expressly incorporated by reference to their entireties.

TECHNICAL FIELD

This document relates to determining a preferred route between an origin location and a destination location.

BACKGROUND

A preferred route between an origin location and a destination location may be determined by a computer system. A computer system may be used to search for an optimal path through a directed graph (e.g., a collection of nodes and edges) that represents a network of roads and intersections. Each edge (or line) of the graph may represent a road in a map, and each node of the graph may represent an intersection of two or more roads or a terminal point of a road, such as a dead end road. The path that requires the least distance or time may be determined, for example, by using the Dijkstra method or A* method. The conventional Dijkstra method or A* method may determine the optimal route based on the distance and/or time required to travel between two nodes.

SUMMARY

In one general aspect, a preferred route may be determined using a computer-implemented routing system. The routing system is used to access an origin and a destination in a routing graph. The routing graph represents a network of roads. The routing graph includes two or more nodes and one or more links. Each link represents a road, and each node represents an intersection of one or more roads or an intersection of a terminal road. The routing system is used to determine a preferred route from the origin to the destination based at least in part upon on intersection cost for at least one intersection in the routing graph. The preferred route is communicated from the routing system to a user system.

Implementations may include one or more of the following features. For example, intersection cost may be based on the geometry of the intersection of one or more roads. The intersection may include an intersection with a turn restriction, a false intersection, a ferry, a ramp-to-ramp transition, a merge from a ramp to a non-ramp, an exit from a non-ramp to a ramp, a first limited-access link to a second limited-access link, a limited-access link to a non-limited access link, an intersection with three links, or an intersection with four or more links. The intersection may be based on a stop level of the intersection.

The preferred route may be a preferred route for driving a vehicle or walking from the origin to the destination.

The routing system may be a routing system provided through an Internet service provider. The routing system and the user system may use the same processor. The preferred route may be communicated from the routing system to the user system over a connection establishing using the Internet.

Implementations of the techniques described may include a method or process, an apparatus or system, or computer software on a computer-accessible medium. The details of one or more implementations are set forth below. Other features will be apparent from the description and drawings, and from the claims.

DESCRIPTION OF DRAWINGS

FIGS. 6 and 7 are block diagrams of example data structures used in determining a preferred route.

Like reference symbols in the various drawings indicate like elements.

DETAILED DESCRIPTION

Techniques are provided for determining a preferred route from an origin location to a destination location. The determination is made by processing directed links (e.g., one-way edges) in a graph that includes one or more links and two or more nodes. The determination of a preferred route may include an estimate of the waiting time required at one or more intersections along alternative routes. Individual routing preferences, such as a preference of a rural route over an urban route, also may be considered. Techniques are described that may help reduce the time required to identify a preferred route, including the identification and removal of paths leading into regions where no outlet or through route exists before processing the directed links, data initialization techniques, and techniques using particular data formats.

Figure 1:
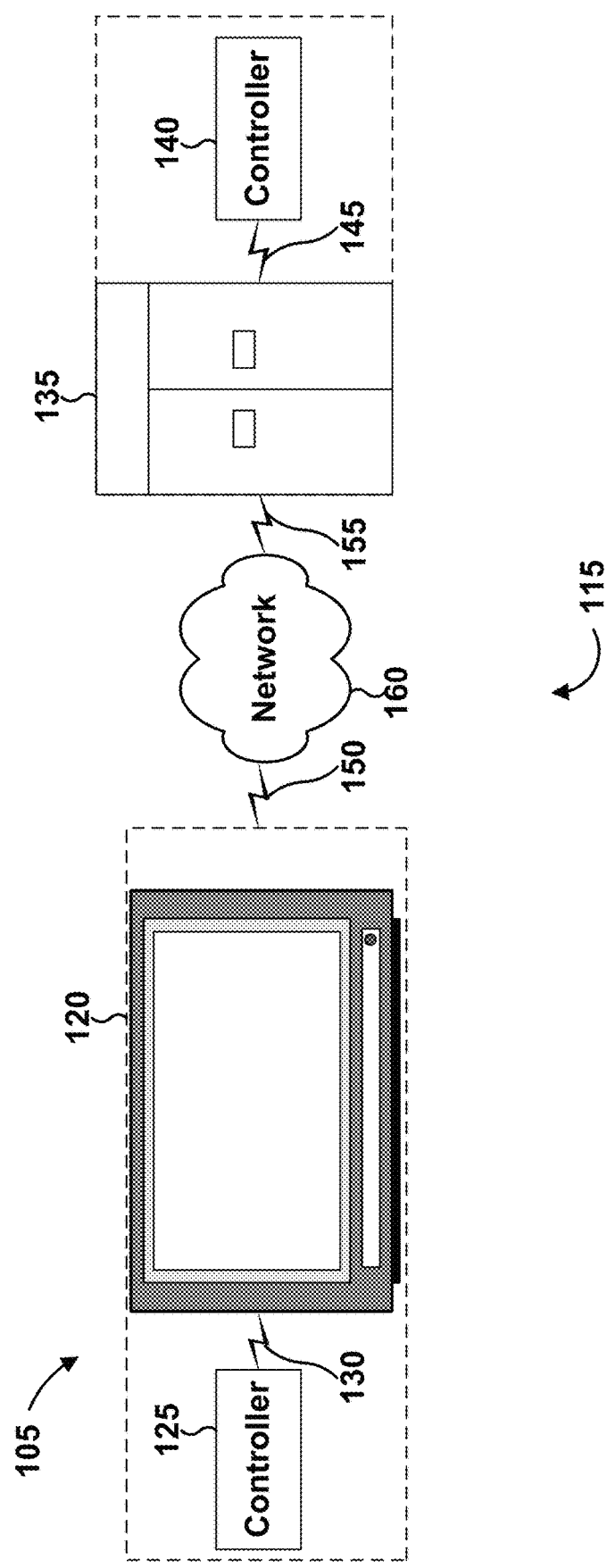
FIG. 1 is a block diagram of a communications system capable of determining a preferred route.
Figure 2:
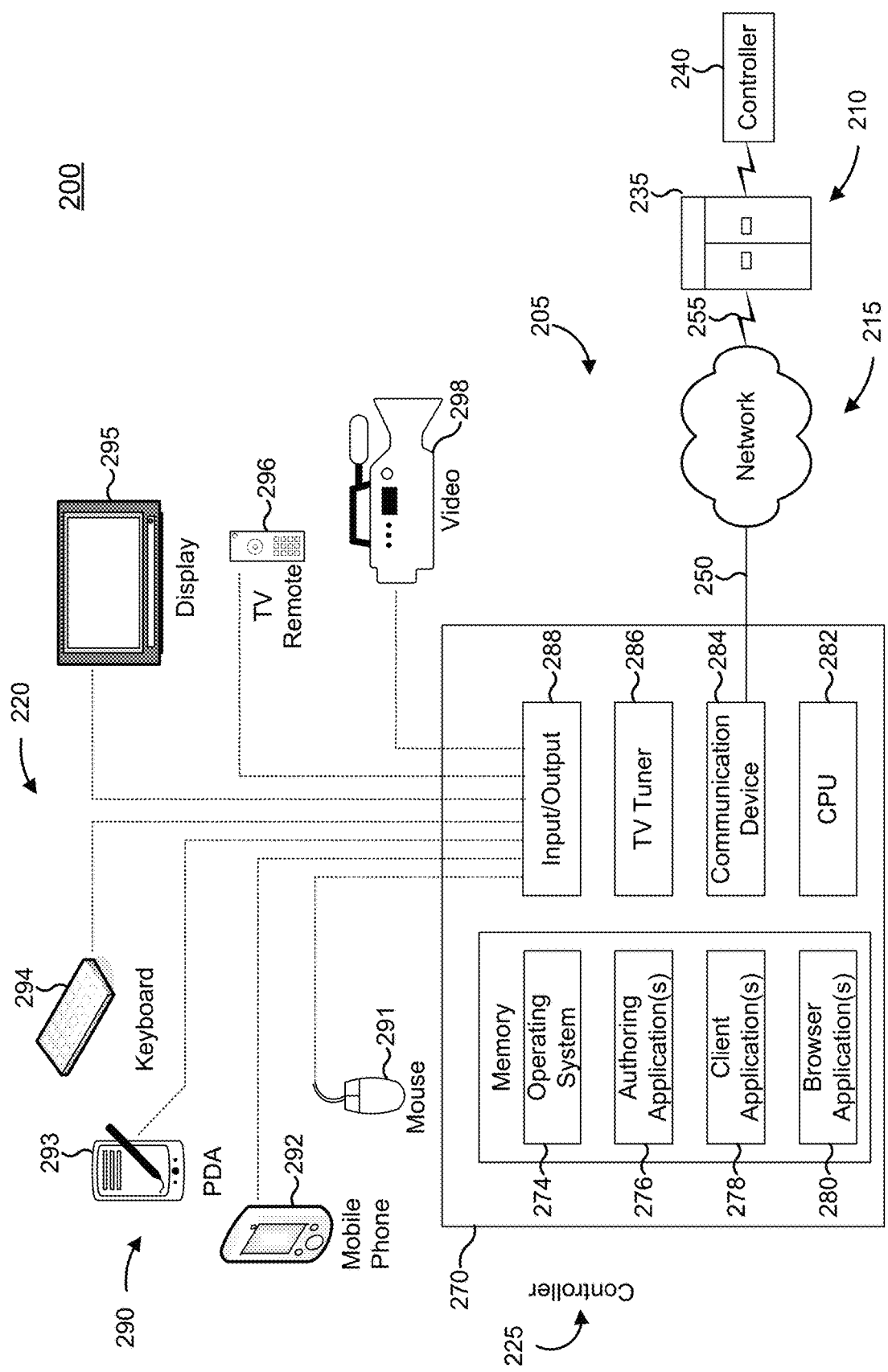
FIG. 2 is an expansion of the block diagram of FIG. 1.

For illustrative purposes, FIGS. 1 and 2 describe a communications system that may be used to request and provide routes between origin and destination locations. For brevity, several elements in the figures described below are represented as monolithic entities. However, as would be understood by one skilled in the art, these elements each may include numerous interconnected computers and components designed to perform a set of specified operations and/or dedicated to a particular geographical region.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

Each of the client device 120, the client controller 125, the host device 135, and the host controller 140 typically includes one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of the client controller 125 or the host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 that provides a direct or indirect communication link between the client system 105 and the host system 110, irrespective of physical separation. Examples of a delivery network 160 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 that enable communications through the one or more delivery networks 260.

Examples of each element within the communication system of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to, and may illustrate one possible implementation of, the client system 105 of FIG. 1.

The client device 220 typically includes a general purpose computer 270 having an internal or external storage 272 for storing data and programs such as an operating system 274 (e.g., DOS, Windows®, Windows® 95, Windows® 98, Windows® 2000, Windows® NT, Windows® Millennium Edition, Windows® XP, OS/2, and Linux) and one or more application programs. Examples of application programs include authoring applications 276 (e.g., word processing, database programs, spreadsheet programs, presentation programs, and graphics programs) capable of generating documents or other electronic content; client applications 278 (e.g., AOL ("America Online") client, CompuServe client, AIM ("America Online Instant Messenger") client, AOL TV ("America Online Television") client, and an ISP ("Internet Service Provider") client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer 270 typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by the communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some, all, or none of the components and devices described above.

Figure 3A:
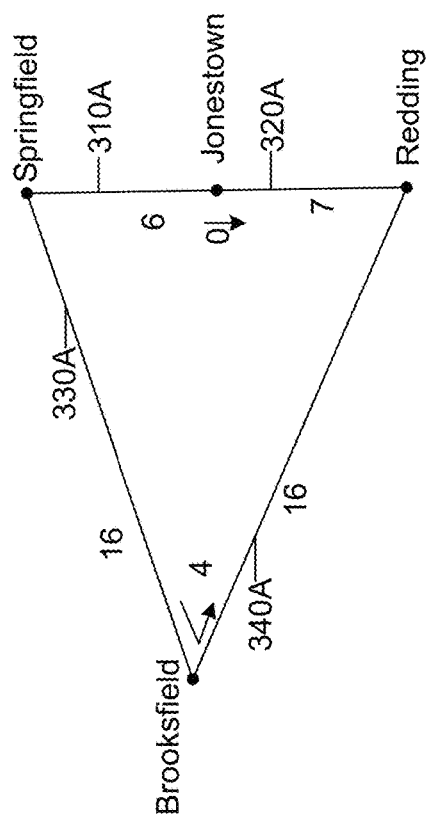
FIGS. 3A, 3 and 4 are diagrams illustrating a process to determine a preferred route between two nodes on a routing graph.

FIG. 3A illustrates an exemplary process to determine a preferred route from an origin location ("origin") to a destination location ("destination") on a routing graph 300A. Routing graph 300A includes a Springfield node, a Jonestown node, a Redding node, and a Brooksfield node. Each node represents a particular city. Directed link 310A represents a road that connects Springfield with Jonestown. Directed link 320A represents a road that connects Jonestown with Redding. Directed link 330A represents a road that connects Springfield with Brooksfield. Directed link 340A represents a road that connects Brooksfield with Redding.

A process to determine a preferred route from Springfield to Redding begins by determining which of the directed links 310A and 330A that are adjacent to the origin, Springfield, should be examined first. The directed link 330A is examined first because directed link 310A has a lower cost (here, 6) than directed link 330A that has a cost of 16. The routing system determines that the destination Redding has not yet been found and proceeds to expand the route from directed link 310A.

The route is expanded from directed link 310A to include directed link 320A. The routing system determines an accumulated cost of the route from Springfield to Redding. The accumulated cost of the route is determined by including the cost from the origin to the previous directed link (here, 6), an intersection cost associated with traveling through the intersection of the previous directed link and the adjacent directed link (here, 0), and a cost associated with traversing the adjacent directed link (here 7). The accumulated cost of traveling from Springfield to Redding is 13. The routing system determines that the destination Redding has been found.

The alternative route from Springfield to Brooksfield to Redding has an accumulated cost of 36. The accumulated cost of the Springfield to Brooksfield to Redding is based on a cost from the origin Springfield to Brooksfield (here, 16), the intersection cost of traveling through the Brooksfield intersection (here, 4), and the cost of traveling from Brooksfield to Redding (here, 16). The cost of the route from Springfield to Jonestown to Redding (here, 13) is less than the cost of the route from Springfield to Brooksfield to Redding (here, 36), and as such, the route from Springfield to Jonestown to Redding is the preferred route.

Various aspects of this simplified illustration are described more fully in the following, as are various other features and combinations of features.

Figure 3B:
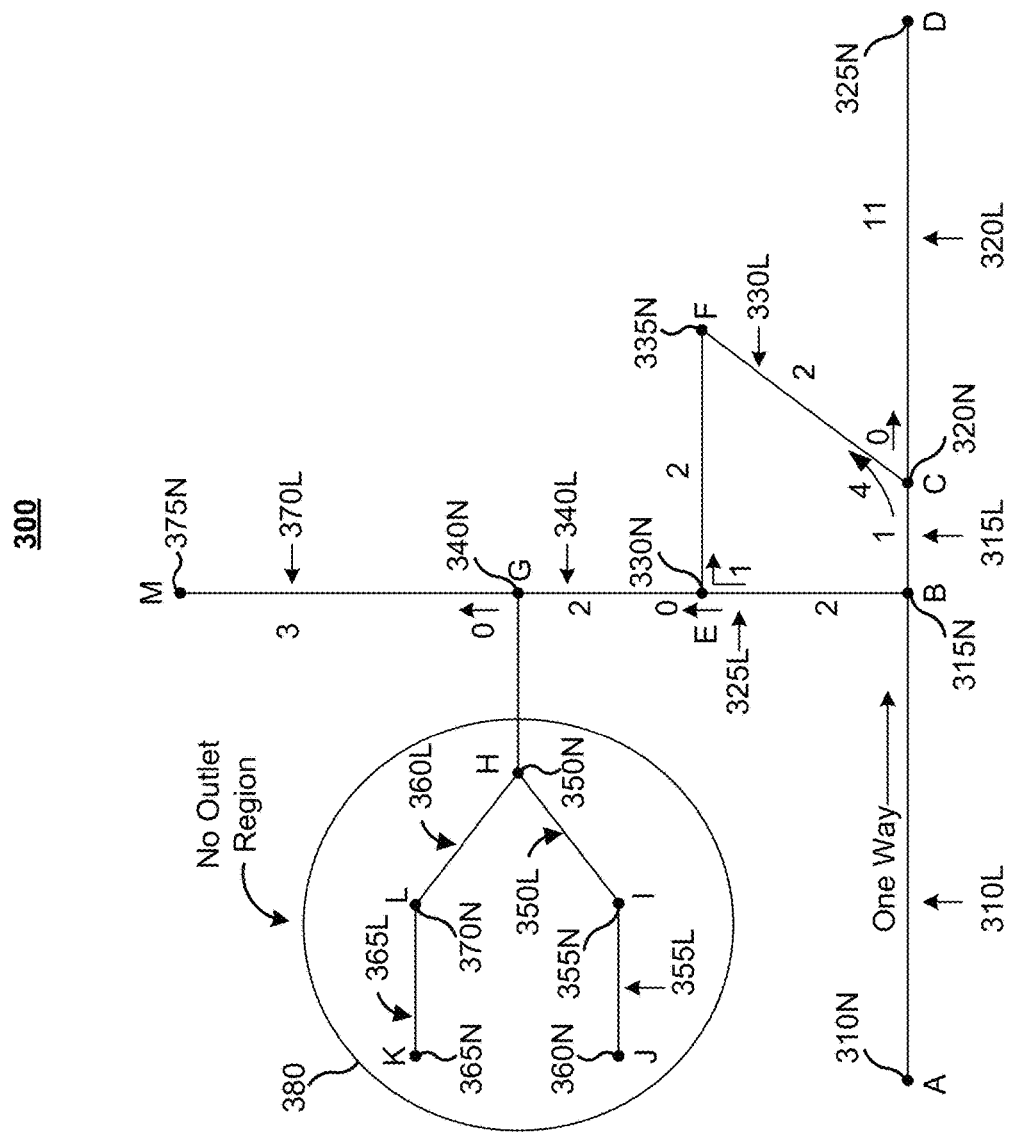
Figure 4:
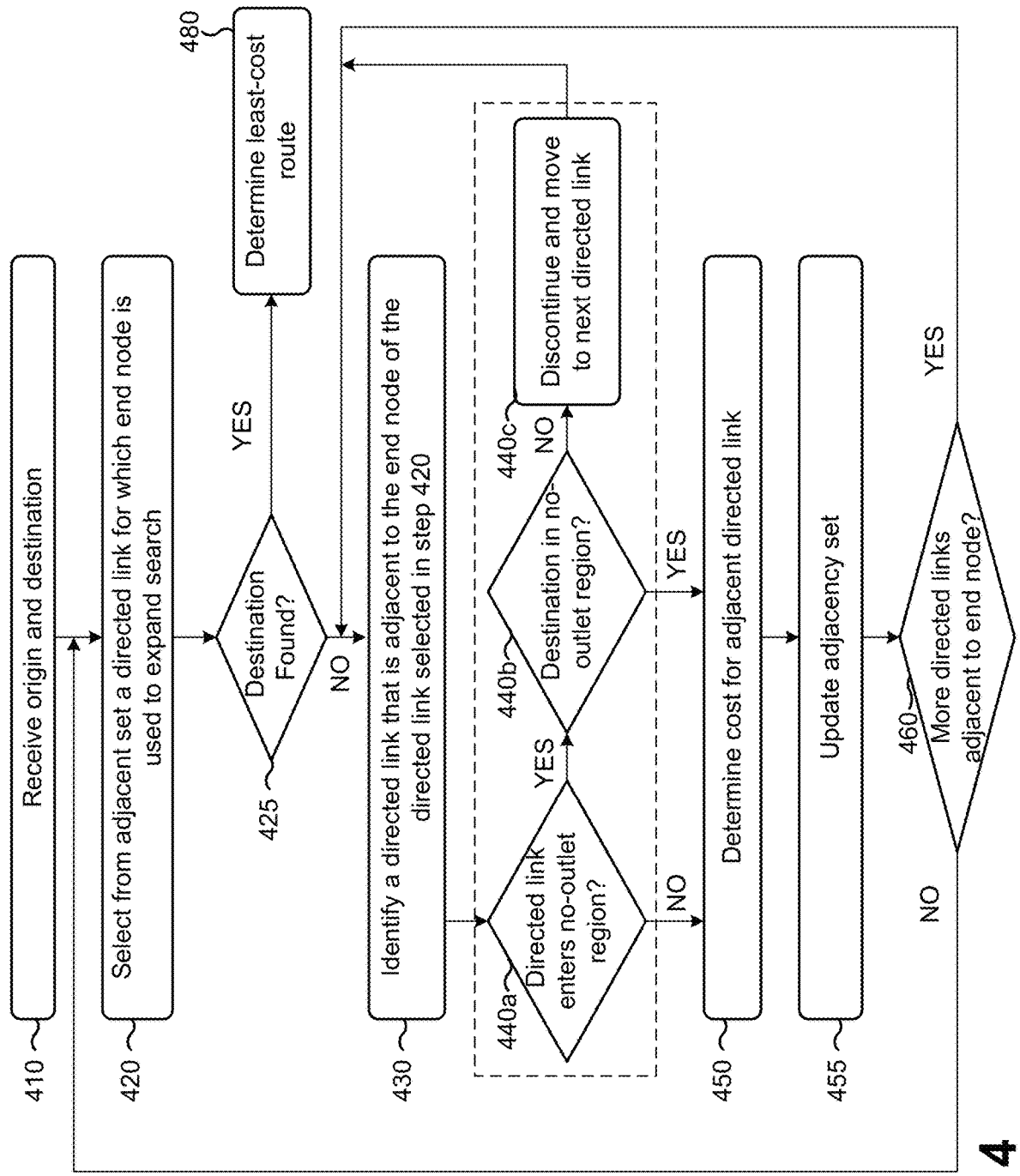

Referring to FIGS. 3 and 4, a process determines a preferred route from an origin to a destination on a routing graph 300. The determination of a preferred route also may be referred to as a search for a preferred mute. In some cases, a preferred route may be an optimal route based on time and/or distance traveled. In other cases, a preferred route may be a non-optimal route. For example, a route that circumvents an urban area may be preferred even when the route is longer than a corresponding urban route.

In general, the routing graph 300 includes a collection of directed links (e.g., one-way edges) and nodes. A node on the routing graph 300 is represented by a point and is labeled by an uppercase alphabetic character (e.g., A, B, or C). A directed link on the routing graph 300 is represented by a line (or edge) that connects two nodes. A directed link may be referenced using an ordered pair of nodes where the order of the nodes corresponds to the direction of travel. For example, a line between two nodes B and C includes two directed links, namely a directed link from B to C that may be referred to as directed link BC, and another directed link from C to B that may be referred to as directed link CB.

The routing graph 300 includes directed links AB 310L, BC 315L, CD 320L, BE 325L, CF 330L, EF 335L, EG 340L, GH 345L, HI 350L, IJ 355L, HL 360L, LK 365L, and GM 370L. The routing graph also includes other directed links (e.g., CB, DC, and EB). The routing graph 300 also includes nodes A 310N, B 315N, C 320N, D 325N, E 330N, F 335N, G 340N, H 350N, I355N, J 360N, K 365N, L 370N, and M 375N.

FIG. 4 illustrates a process 400 to determine a preferred route using directed links. The process may be performed by a routing system, such as, for example, host system 110 of FIG. 1 or host system 210 of FIG. 2. In general, to determine a preferred route, the routing system processes a particular directed link from a set of directed links by identifying one or more directed links that are adjacent to the end node of the particular directed link. For each directed link identified, the routing system determines a cost associated with the directed link and adds the directed link and its associated cost to the set of directed links. The routing system continues by selecting a directed link from the set and identifying one or more directed links that are adjacent (e.g., expanding the search set) until the destination has been reached or found. The destination has been reached, for example, when one or more identified directed links that include the destination as an end node. The preferred route is determined based on the collection of identified directed links (e.g., a route) that has the lowest cost.

The process 400 begins when an origin and a destination are received or otherwise obtained by the routing system (step 410). The origin received may be a directed link or a node that is associated with an origin location from which the preferred route is to start. Similarly, the destination received may be a directed link or a node from which the preferred route is to end. When a node is received as an origin, a directed link that includes the origin node as an end node may be identified. The identified directed link may be placed in a directed link list. Alternatively, one or more directed links that are adjacent to the origin node may be identified and placed in a directed link list. The directed link list may be referred to as an adjacency set or a priority set. The adjacency set may be organized as a data set, a database table, an object instance, a linked list, a XML-document, a text file, or another data structure. The data structure may be stored in persistent or transient storage, including a portion of memory of the routing system.

The routing system selects a directed link from the adjacency set (step 420). The end node of the selected directed link is used as a focus point from which one or more adjacent direct links are identified, processed, and added to the adjacency set. This may be referred to as expanding the search or expanding the adjacency set. The routing system may select a particular directed link from the adjacency set based on a cost associated with the directed link. The routing system may select the directed link associated with the least cost. For example, the directed links in the adjacency set may be maintained in order from the least cost to the greatest cost (i.e., sorted by cost). The routing system then may select the directed link that appears first in the adjacency set to select the directed link with the least cost. Some implementations may use other processes or software engineering techniques to determine the directed link with the least cost and/or otherwise determine a focus point for the search.

When a directed link has been selected from the adjacency set (step 420), the routing system then determines whether the destination has been found or identified (step 425). For example, the routing system determines whether the selected directed link corresponds to the destination directed link received. The routing system also may determine whether the selected directed link has an end node equal to the destination end node. In some implementations, the directed link may be added to the done set when the directed link is selected in step 420.

When the routing system determines that the destination has not been found (step 425), the routing system identifies a directed link that is adjacent to the end node of the selected directed link (step 430). The identified directed link may be referred to as an adjacent directed link. To identify a directed link that is adjacent to the end node, the routing system may access node information stored in a table or list. The node information may include a list of the directed links that are adjacent to each node in the routing graph. This may be referred to as an adjacent directed link list. The routing system may identify a directed link that is adjacent to an end node by selecting one of the directed links in the adjacent directed link list.

In some implementations, the routing system may select a directed link from the adjacent directed link list based on the order in which the directed links are presented in the list of directed links. If so, the order of the directed links in the directed link list in the node information may help reduce the time required to determine a preferred route. For example, when determining a driving route, the driveable directed links may be presented first. A driveable link refers to a directed link that may be used by a vehicle proceeding in the direction of the directed link. A two-way road is an example of a driveable link. In contrast, a directed link is not a driveable directed link when the directed link is a one-way road having a travel direction not in the desired direction. A routing system that selects the driveable directed links to process before the selection of directed links that are not driveable may result in a more efficient routing determination process.

Alternatively or additionally, a routing system may identify a directed link that is adjacent to the end node of the selected directed link based on the access of directed link information that includes the start node of the directed link. The routing system may identify a directed link in step 430 by searching the directed link information to identify a particular directed link that includes a start node that matches the end node of the selected directed link.

The routing system determines whether the adjacent directed link is a directed link that enters a no-outlet region, and, if so, processes the directed link accordingly (step 440). A no-outlet region refers to a region of a routing graph that, when entered, may only be exited by traversing the reverse directed link used to enter the region. In FIG. 3, for example, a no-outlet region 380 may include the directed links GH 345L, HI 350L, IJ 355L, HL 360L, and LK 365L. The corresponding directed links in the opposition direction HG, IH, JI, KL, and LH also are within the no-outlet region. The directed link GH 345L is a directed link that enters the no-outlet region, and may be identified as a directed link that occurs within the no-outlet region. In some implementations, the directed link (here, GH 345L) that enters the no-outlet region may not be identified as a directed link that occurs within the no-outlet region.

The determination of whether the directed link is a directed link that enters a no-outlet region and associated conditional processing (step 440) includes three sub-steps. The first sub-step is the determination of whether the directed link is a directed link that enters a no-outlet region (sub-step 440a). The routing system may make the determination of whether the directed link is a directed link that enters a no-outlet region, for example, based on directed link information stored in a table or list. The directed link information may include whether a particular directed link enters a no-outlet region. The routing system may identify directed links that enter a no-outlet region, for example, based on a process described below with respect to FIG. 10.

Figure 10:
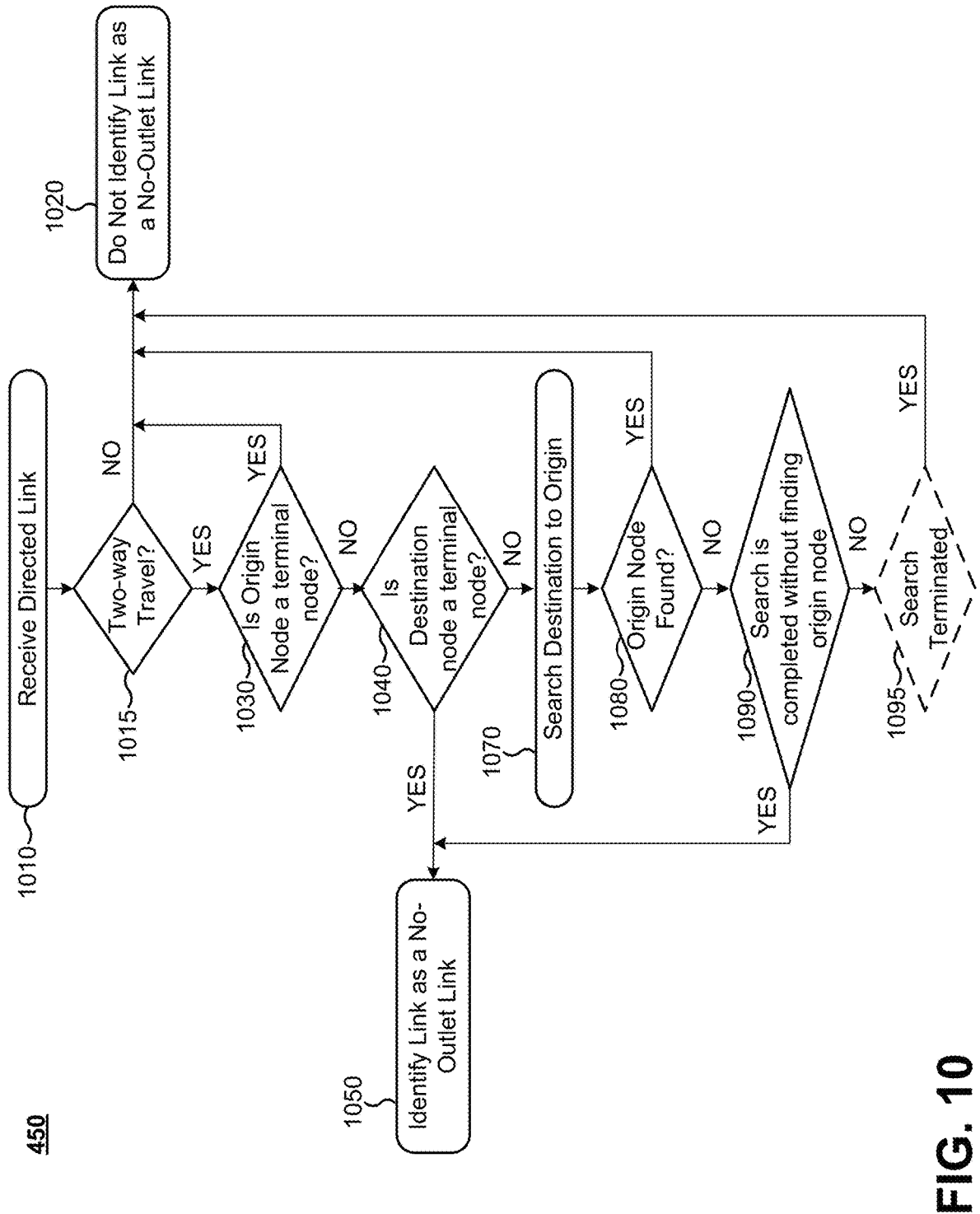

Alternatively or additionally, the routing system may make the determination of whether a directed link is a directed link that enters a no-outlet region, for example, based on the dynamic execution of a process the same as or similar to the process described with respect to FIG. 10.

When the routing system determines that the adjacent directed link is not a directed link that enters a no-outlet region (sub-step 440a), the routing system determines a cost for the adjacent directed link (step 450). The cost determined may include the cost from the origin to the previous directed link, an intersection cost associated with traveling through the intersection of the previous directed link and the adjacent directed link, and a cost associated with traversing the adjacent directed link.

The cost from the origin to the previous directed link may be determined based on the accumulated cost associated with the previous directed link. Alternatively, the cost from the origin to the previous directed link may be determined based on the storage by the routing system of an aggregate cost of the each particular route that is included in the search process.

The intersection cost associated with traveling through the intersection of the previous directed link and the adjacent directed link may be based on the inferred presence of a stop sign, yield sign, traffic light, or other type of traffic control that may increase the likelihood of a stop at an intersection. The likelihood of a stop at an intersection may be referred to as a stop level of the intersection. The stop level may also include an estimate of the length of time waiting at the intersection. The stop level of the intersection may be based on the types of roads that intersect. For example, the stop level of an intersection may be based on the intersection of two roads of differing road class type (e.g., an interstate, a U.S. highway, a state road, and a local road). The stop level that may be assigned to an intersection may be a value that occurs within a predetermined range of allowed values. For example, a stop level may be from negative two to two. Negative stop level values may represent more favorable conditions (e.g., a stop is less likely to occur and the time cost associated with the intersection is less severe). Positive stop level values may represent less favorable conditions (e.g., a stop is more likely to occur and the time cost associated with the intersection is more severe).

Additionally or alternatively, a name change of roads associated with the intersection may be determined. A higher intersection cost may be associated with a road name change than an intersection cost that does not include a road name change.

Additionally or alternatively, the intersection cost associated with traveling through the intersection of the previous directed link and the adjacent directed link may be based on the geometry of the roads at the intersection. The geometry of the intersection may describe the number of roads and the orientation of each road to one or more other roads that intersect.

Additionally or alternatively, the intersection cost associated with traveling through the intersection of the previous directed link and the adjacent directed link may be based on one or more conditions that may include an intersection with a turn restriction, a false intersection, a ferry, a ramp-to-ramp transition, a merge from a ramp to a non-ramp, an exit from a non-ramp to a ramp, a first limited-access link to a second limited-access link, a limited-access link to a non-limited access link, an intersection with three links, or an intersection with four or more links.

The routing system may determine the intersection cost associated with traveling through the intersection of the previous directed link and the adjacent directed link, for example, based on directed link information stored in a table or list that includes an intersection cost associated with a particular turn in an intersection. The intersection cost information for a turn in an intersection may be determined by a process described below with respect to FIG. 9. Alternatively or additionally, the routing system may make the determination of an intersection cost for an intersection, for example, based on the dynamic execution of a process the same as or similar to the process described with respect to FIG. 9. The use of an intersection cost may result in a route that has fewer maneuver changes (e.g., the route may tend to stay on the same roads longer) than if an intersection cost was not included in the cost of the route.

The cost associated with traversing the adjacent directed link may be a predetermined cost value for traversing the adjacent directed link. The cost also may be a cost value that is determined based on a formula. For example, a cost may be determined based on the length of the adjacent directed link multiplied by a reciprocal of an estimate of an assumed travel speed or other assumed travel speed. The assumed travel speed may be multiplied by a factor that favors or disfavors the directed link in the determination of a preferred route.

In some implementations, the routing system may include a cost associated with a directed link based on the density of the directed links within a predetermined area in which the directed link is located. The routing system may include a density cost as part of the cost for traversing the adjacent directed link. For example, a routing graph or a geographical area may be divided into equal-sized areas. The equal-sized areas may be referred to as tiles. A tile may be based on longitude and latitude coordinates. The density of a particular tile may be determined based on the number of directed links that are included in the tile. The density of one tile may be compared with the density of a different tile. A cost associated with traversing a particular directed link may reflect the density of the tile in which the directed link is located. For example, a directed link in a lower density tile may be given a lower density value than the density value given to a different directed link located in a tile with a higher density of directed links. A routing system that includes a density value may permit the determination of a preferred route based on a preference for routes that occur through lower density regions. Lower density regions may correspond to rural routes, and higher density regions may correspond to urban routes.

When the routing system has determined a cost for the adjacent directed link, the routing system updates the adjacency set (step 455). When the adjacent directed link is not included in the adjacency set, the routing system updates the adjacency set by adding the adjacent directed link to the adjacency set and associating the cost determined in step 450 with the adjacent directed link in the adjacency set. When the adjacent directed link is included in the adjacency set, the routing system updates the adjacency set by first comparing the cost associated with the adjacent directed link in the adjacency set to the cost determined in step 450 for the adjacent directed link. Then the routing system updates (step 455) the adjacency set by updating the cost associated with the adjacent directed link with the cost determined for the adjacent directed link in step 450. This update may not be performed unless the cost determined in step 450 for the adjacent directed link is less than the cost associated with the adjacent directed link in the adjacency set.

When the routing system has updated the adjacency set (step 455), the routing system determines whether more directed links adjacent to the end node that is the focus point are to be processed (step 460). If so, the routing system proceeds to identify a directed link that is adjacent to the end node (step 430), as previously described above. If not, the routing system selects a directed link from the adjacency set (step 420) and proceeds as described previously.

When the routing system determines that the adjacent directed link is a directed link that enters a no-outlet region (sub-step 440*a*), the routing system determines whether the destination lies within a no-outlet region (sub-step 440*b*). If the destination is not within the no-outlet region, all routes that enter the no-outlet region may be skipped when determining the preferred route. The routing system discontinues processing of the adjacent directed link (sub-step 440*c*) (e.g., the routing system does not determine a cost for the adjacent directed link in step 450). This eliminates searching of all directed links that lie beyond the directed link that enters the no-outlet region. The routing system takes appropriate action to continue the search without processing the adjacent directed link. For example, the routing system may identify a different directed link that is adjacent to the end node of the selected directed link (step 430).

When the routing system determines that the destination lies within the no-outlet region (sub-step 440*b*), the routing system continues the processing of the directed link by determining a cost for the adjacent directed link (step 450). The routing system continues as described previously.

When no additional directed links are adjacent to the end node (step 460), the routing system may select a directed link for which the end node is used to expand the search (step 420).

When the routing system determines that the destination has been found or identified (step 425), the routing system determines the least-cost route (step 480). The routing system may determine the least-cost route by tracing back through the adjacent directed links that comprise the route. For example, the routing system may trace back through the adjacent directed links that comprise the route through the use of information that identifies the previous directed link for each directed link in the adjacency set. Other software engineering methods, processes or techniques may also be used to determine the least-cost route after the destination has been found. The least-cost route also may be referred to as a preferred route.

The capability of a routing system to identify a directed link that enters a no-outlet region may help improve the efficiency in which a preferred route is determined. For example, the directed links that emanate from the directed link that enters a no-outlet region may be eliminated from processing. In FIG. 3, the directed links HI 350L, IJ 355L, HJ 360L, and LK 365L may be eliminated from processing when GH 345L is identified as a directed link that enters the no-outlet region 380. The directed links HI 350L, IJ 355L, HJ 360L, and LK 365L may be referred to as no-outlet links.

Alternatively, when the destination lies within a no-outlet region, some implementations may eliminate the determination of whether a directed link enters a no-outlet region (step 440) for one or more portions of process 400. The determination of whether a directed link enters a no-outlet region (step 440) may be performed for some of the directed links selected in step 430 and not for other directed links selected in step 430. For example, when a directed link is selected in step 430 and the directed link is within a predetermined distance from the destination, the determination of whether a directed link enters a no-outlet region (step 440) may be skipped. This allows the search to proceed to the destination. When a directed link is selected in step 430 and the directed link is not within a predetermined distance from the destination, the determination of whether a directed link enters a no-outlet region (step 440) may be performed. When the determination of whether a directed link enters a no-outlet region (step 440) is eliminated for portions of process 400 (e.g., the determination is performed for some directed links and not for other directed links), the determination of a preferred route may be more efficient than if the determination of whether a directed link enters a no-outlet region was not performed for any directed links during the performance of process 400.

The elimination of a directed link that enters a no-outlet region and/or directed links that occur within a no-outlet region may help improve the efficiency with which a preferred route is determined. The directed link itself and the directed links that emanate from the directed link (e.g., the no-outlet links within the no-outlet region) may be eliminated from processing. This may result in a substantial reduction of the number of directed links processed during the determination of a preferred route.

Some implementations may select a particular node in step 420 and identify a directed link that is adjacent to the selected node in step 430.

The use of directed links when a preferred route is determined may provide advantages over a conventional method of processing nodes to determine a route. For example, a route determination process that uses nodes may prohibit a route that passes through the same node more than once in a route. This restriction may result in a less-than-optimal route under some circumstances, such as when particular types of turn restrictions are imposed on a preferred route. For instance, when a preferred route includes a left turn at a particular intersection of two roads and a left turn is prohibited at the intersection, the preferred route may go straight through the intersection, make three right turns, and pass straight through the intersection a second time (because the left turn is prohibited). Such a preferred route may be prohibited in a node-based processing system that prohibits a route that passes through the same node more than once.

Figure 5:
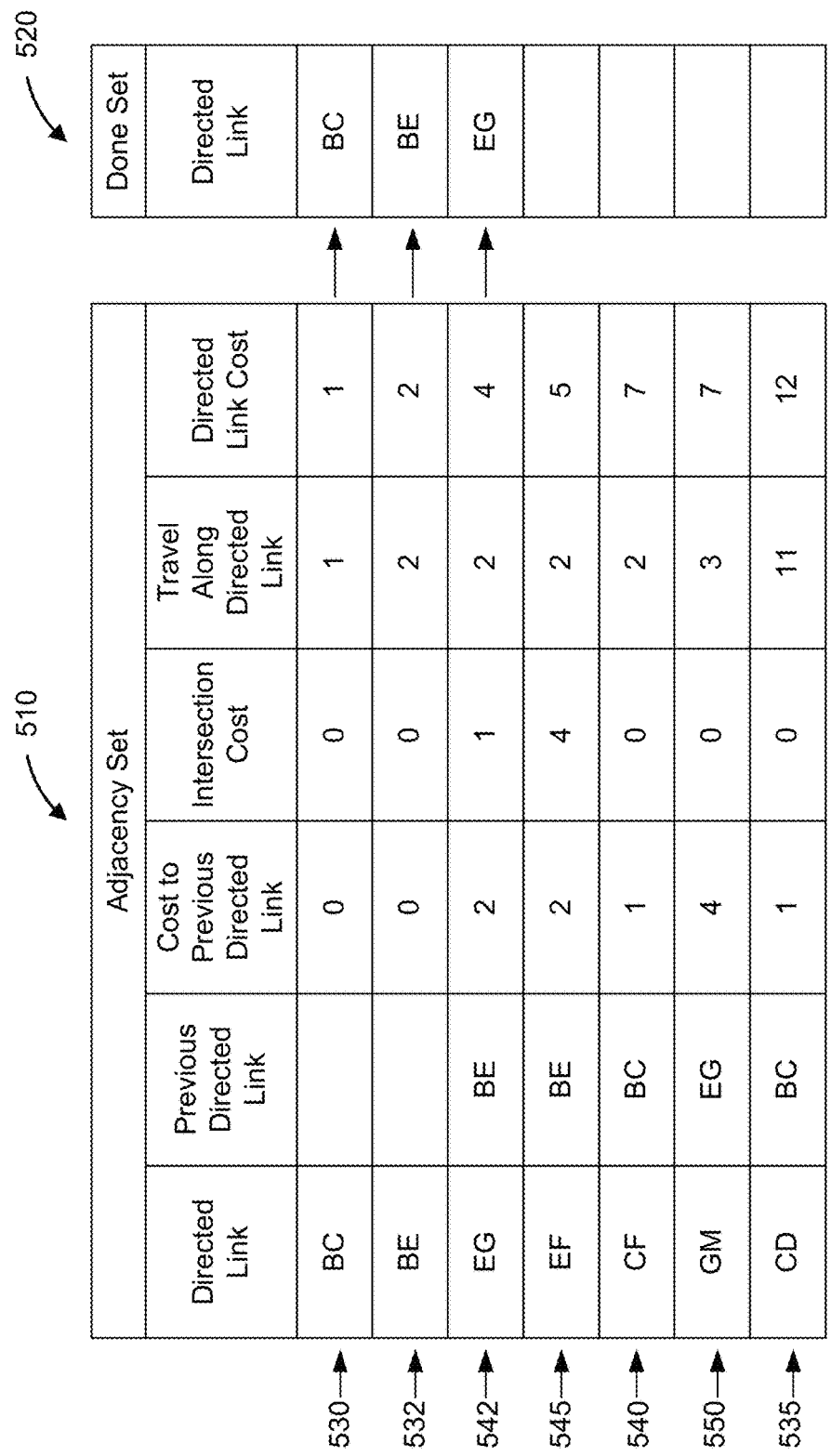
FIG. 5 is a block diagram that illustrates the results of determining a preferred route.

FIG. 5 illustrates the results of determining a preferred route using directed links. A preferred route is determined from node B 315N to node M 375N in routing graph 300 of FIG. 3. Data 500 includes an adjacency set 510 that includes one or more directed links that have been identified by the routing system as adjacent (or otherwise near) a particular portion of the route graph 300 (e.g., adjacent to an end node of a particular directed link). The adjacency set also may be referred to as a priority set.

Data 500 also includes a done set 520 that includes one or more directed links for which processing has been completed. The done set 520 also may be referred to as a completed set. A particular directed link is moved from the adjacency set 510 to the done set 520 when the routing system has completed processing of the particular directed link.

The routing system begins the routing determination process with the adjacency set 510 and the done set 520 empty of directed links. The routing system receives node B 315N as the origin and node M 375N as the destination node. For example, the nodes may be received in a manner similar to the manner described with respect to step 410 in FIG. 4. The routing system accesses node information for node B 315N to determine that the directed link BC 315L and the directed link BE 325L are adjacent to node B 315N, for example, in a manner similar to the manner described with respect to step 430 in FIG. 4. The routing system adds the directed link BC 530 and the directed link BE 532 to the adjacency set. For each directed link BC and BE in the adjacency set, the routing system determines a directed link cost. The directed link cost is determined in a manner similar to the manner described with respect to step 450 in FIG. 4. Specifically, the routing system determines the directed link cost by summing the previous cost to get to the start node of the directed link, an intersection cost associated with traveling through the intersection of the previous directed link and the directed link, and a cost associated with traversing the directed link. The directed link BC includes the origin node B 315N as the starting node. Here, the previous cost for the directed link is zero, as is the intersection cost. The cost to traverse directed link BC 315L is 1 as shown in FIG. 3. The routing system associates the directed link cost of 1 with the directed link BC 530 in the adjacency set 510. Similarly, the routing system determines a directed link cost of 2 for directed link BE 532. Because the directed link BE 325L emanates from the starting node B 315N, the directed link cost for directed link BE is based on the cost of 2 to traverse the directed link, as shown in FIG. 3.

The routing system selects directed link BC (particularly, end node C) to use as a focus point in expanding the adjacency set, for example, in a manner similar to the manner described with respect to step 420 in FIG. 4. Specifically, directed link BC has the least directed link cost of the directed links BC 530 (with a directed link cost of 1) and BE 532 (with a directed link cost of 2) in the adjacency set. The routing system accesses node information for node C 320N to determine that directed links CD 320L and CF 330L in FIG. 3 are adjacent to directed link BC 315L, for example, in a manner similar to the manner described with respect to step 430 in FIG. 4. The routing system also may determine that directed link CB is adjacent to node B 315N. The routing system does not process directed link CB because directed link CB requires a U-turn and typically is not the preferred route. Some implementations may process directed link CB in the same manner as the routing system processes directed links CD 320L and CF 330L in FIG. 3.

The routing system determines that the destination node M 375N in FIG. 3 has not yet been identified, for example, in a manner similar to the manner described with respect to step 425 in FIG. 4.

The routing system selects directed link CD 320L as a particular adjacent directed link with which to work (see, e.g., step 430 in FIG. 4). The routing system determines that CD 320L is not a directed link that enters a no-outlet region (see, e.g., step 440 in FIG. 4). The routing system then determines the cost for directed link CD 320L (see, e.g., step 450 in FIG. 4). The cost from the origin (here, B 315N) to the previous directed link (here, BC) is 1 as reflected in the cost associated with directed link BC 530 in the adjacency set. The routing system adds the intersection cost associated with traveling through the intersection of directed link BC and directed link CD. Here, the route travels straight through node C 320N. The intersection cost associated with traveling straight through node C 320N is 0, as shown in FIG. 3. This intersection cost of 0 may reflect, for example, that a road name change does not occur and that the road that corresponds to directed link BC and directed link CD is an U.S. highway. The cost of traversing the adjacent directed link (here, CD 320L) is 11, as shown in FIG. 3. The routing system associates a cost of 12 with directed link CD 535 in the adjacency set 510.

The routing system selects directed link CF 330L as a particular adjacent directed link with which to work (see, e.g., step 430 in FIG. 4). The directed link CF 330L is a directed link adjacent to the end node C 320N of directed link BC. The routing system determines that the directed link CF 330L is not a directed link that enters a no-outlet region and so proceeds to determine a cost associated with the directed link CF 330L that is adjacent to end node C of directed link BC. The routing system determines the cost for directed link CF 330L. The cost from the origin (here, B 315N) to the previous directed link (here, BC) is 1 as reflected in the cost associated with directed link BC 530 in the adjacency set. The routing system adds the intersection cost associated with traveling through the intersection of directed link BC and directed link CF. Here, the intersection cost associated with the geometry of the roads turning left through node C 320N is 4, as shown in FIG. 3. The cost of traversing the adjacent directed link (here, CF 330L) is 2, as shown by FIG. 3. The routing system associates a cost of 7 with directed link CF 540 in the adjacency set 510. The routing system stores the directed link CF 540 in sort order in the adjacency set 510, as shown in FIG. 5.

The routing system determines that no more directed links are adjacent to end node B 315N (see, e.g., step 460 in FIG. 4). The routing system moves the directed link BC 530 from the adjacency set 510 to the done set 520. This may help improve the efficiency of determining a preferred route. For example, moving a directed link from the adjacency set 510 to the done set 520 may permit the routing system to select the first directed link in the adjacency set without determining whether the first directed link has been processed (e.g., the directed links adjacent to the end node of the directed link have been identified and a cost has been associated with each adjacent directed link).

The routing system selects directed link BE (particularly, end node E) to use as a focus point in expanding the adjacency set. The routing system selects directed link BE 532 because directed link BE 532 has the least cost of the directed link remaining in the adjacency set (e.g., the directed links that have not yet been processed). The routing system also may determine that directed link EB is adjacent to node E 330N. The routing system does not process directed link EB because directed link EB requires a U-turn from node E 330N and typically is not the preferred route.

The routing system determines that the destination node M 375N in FIG. 3 has not yet been identified (e.g., step 425 in FIG. 4).

The routing system accesses node information to determine that directed link EG 340L in FIG. 3 is adjacent to directed link BE 325L (see, e.g., step 430 in FIG. 4). The routing system determines that directed link EG 340L is not a directed link that enters a no-outlet region. The routing system determines the directed link cost for the directed link EG 340L. The cost from the origin to the previous directed link (here, BE) is 2, based on the directed link cost of BE 532 in the adjacency set. The intersection cost associated with traveling through the intersection of BE 325L to EG 340L is 0, as shown in FIG. 3. This intersection cost may be based on the types of roads that intersect or other intersection costing factors and condition information. The cost to traverse directed link EG 340L is 2. The directed link cost for EG 340L is 4. The routing system associates the directed link cost of 4 with directed link EG 542 in the adjacency set 510.

The routing system proceeds with determining the directed link cost for directed link EF 335N in FIG. 3. The cost from the origin to the previous directed link (here, BE) is 2, based on the directed link cost of BE 532 in the adjacency set. The intersection cost associated with traveling through the intersection of BE 325L to EF 335N is 1, as shown in FIG. 3. This intersection cost may be based on the type of roads that intersect, a name change of the intersecting roads, the geometry of the intersection, or other intersection costing factors or intersection condition information. The cost to traverse directed link EF 335N is 2. The directed link cost for EF 335N is 5. The routing system associates the directed link cost of 5 with directed link EF 545 in the adjacency set 510.

The routing system determines that no more directed links are adjacent to end node E 330N, for example, in a manner similar to the manner described with respect to step 460 in FIG. 4. The routing system moves the directed link BE 532 from the adjacency set 510 to the done set 520.

The routing system selects directed link EG 542 (particularly, end node G) to use as a focus point in expanding the adjacency set based on the directed link cost of the directed links in the adjacency set 510. The routing system selects directed link EG 542 because the directed link EG 542 has the least cost of the directed links that remain in the adjacency set (e.g., the directed links that have not yet been processed). The routing system determines that the destination node M 375N in FIG. 3 has not yet been identified, for example, in a manner similar to the manner described with respect to step 425 in FIG. 4.

The routing system accesses node information to determine that directed link GH 345L in FIG. 3 is adjacent to directed link EG 340L (see, e.g., step 430 in FIG. 4). The routing system determines that directed link GH 345L is a directed link that enters a no-outlet region. Consequently, the routing system may not determine the directed link cost for the directed link GH 345L. The directed link GH 345L is not be placed in the adjacency set 510 or the done set 510. This may help ensure that directed links that are accessible only through GH 345L, such as directed links HI 350L, IJ 355L, HL 360L, and LK 365L, are not processed. This may help improve the efficiency of determining a preferred route.

The routing system proceeds with determining the directed link cost for directed link GM 370L in FIG. 3. The cost from the origin to the previous directed link (here, EG 542) is 4, based on the directed link cost of EG 542 in the adjacency set. The intersection cost associated with traveling through the intersection of EG 340L to GM 370L is 0, as shown in FIG. 3. This intersection cost may be based on the type of roads that intersect, a name change of the intersecting roads, the geometry of the intersection, or other intersection costing factors or intersection condition information. The cost to traverse directed link GM 370L is 3, as shown in FIG. 3. The directed link cost for GM 370L is 7. The routing system associates the directed link cost of 7 with directed link GM 550 in the adjacency set 510.

The routing system determines that no more directed links are adjacent to end node G 340N (see, e.g., step 460 in FIG. 4). The routing system moves the directed link EG 542 from the adjacency set 510 to the done set 520. In some implementations, the routing system may move the directed link to the done set when the directed link is selected in step 420.

The routing system determines that the destination node M 375N in FIG. 3 has been identified (see, e.g., step 425 in FIG. 4). In some implementations, the routing system may continue to search for a preferred route even after identifying the destination node. A routing system may continue to search even after identifying the destination node because the first route identified may not be the preferred route. In some implementations, particularly in implementations that move a selected directed link to the done set in step 420, the routing system may continue processing a selected route until the directed link that includes the destination end node is place in the done set. For example, the routing system may continue processing until the directed link GM is placed in the done set 520. The routing system may select and process the directed link EF 335L (steps 420-455) and select the directed link GM in step 420. The routing system then may add the directed link GM to the done set and determine that the destination has been found.

The routing system determines the least-cost route by traversing from the directed link that includes the destination node as an end node. Here, the routing system traverses from directed link GM 370L to directed link EG 340L to directed link BE 325L, which includes the origin node B 315N as a starting node. The routing system may traverse the directed links, for example, by storing the previous directed link for each directed link in the adjacency set 510. Some implementations may use other software engineering methods, processes, and/or techniques to traverse the directed links that are included in the preferred route. The least-cost and preferred route traverses BE 325L, EG 340L, and GM 370L.

Some implementations may use other software engineering methods, processes and/or techniques to determine the cost from the origin to a previous directed link when determining the directed link cost of a particular directed link. For example, the routing system may traverse the links from the previous link to the origin and accumulate the directed link cost for the each link traversed.

In some implementations, the adjacency set and done set may be a simple list or a sorted list. In such implementations, clearing the information associated with previous route determinations may be straightforward. Other implementations may store temporary information per node or directed link in the route network. The temporary information may describe whether a particular node or particular directed link belongs to an adjacency set, a done set, or neither the adjacency set or done set. The temporary information also may describe the associated cost and predecessor information for a node or directed link. In such implementations, the time to determine a preferred route may be reduced when the routing system does not clear or initialize the associated cost and/or predecessor directed link in the temporary information before beginning the determination of a preferred route. The determination of a preferred route is not affected because the routing system associates a cost and predecessor directed link when the directed link is processed (e.g., the cost and predecessor directed link from a previous route determination is overwritten with the cost and predecessor directed link associated with the current route determination process).

For example, temporary information may include for each directed link, an associated cost, a predecessor directed link, and an indication of whether the directed link has been processed (e.g., moved to a done set or the adjacency set). The routing system may prepare the temporary information for the start of a new search by modifying each indicator to indicate that the directed link to which the indicator relates has not been processed (not in either the adjacency nor done set). The cost and predecessor directed link information from the prior route determination process may be modified (e.g., overwritten) by the subsequent route determination process. This may provide efficiency improvements over an implementation that removes, deletes, or otherwise clears the entire temporary information before starting a new search. Similarly, efficiency improvements may occur when only portions of the temporary information are cleared from the routing system memory or other data storage device.

FIG. 6 is an example of a data structure 600 for node information. Node information may be used by one or more steps in the determination of a preferred route. The data structure 600 represents an example of how node information may be organized. In general, the node information in data structure 600 is used in a process to determine a preferred route. In some cases, the node information in data structure 600 or portions of the node information in data structure 600 may be created and stored using data structure 600 during a process to determine a preferred route. This may be referred to as the dynamic generation of node information.

The node information data structure 600 includes a node identifier 610, directed links 620, a driveable link count 630, and a total link count 640. The node identifier 610 uniquely identifies the particular node. Directed links 620 identify the directed links that are adjacent to the node. For example, directed links 620 may include a list of the directed link identifiers that are adjacent to the node. Directed links 620 also may point to a position in a directed link index that is associated with the first directed link that is adjacent to the node. When the directed link index is organized so that the directed links adjacent to a particular node are linked, additional directed links that are adjacent to the node also may be identified. The driveable link count 630 indicates the number of drivable directed links that are adjacent to the node. The total link count 640 indicates the total number of links (e.g., driveable directed links and non-driveable directed links) that are adjacent to the node. In some implementations, the node identifier 610 may be determined based on the position information of the node relative to one or more other nodes and/or one or more directed links.

FIG. 7 is an example of a data structure 700 for directed link information. Directed link information may be used by one or more steps in the determination of a preferred route. The data structure 700 represents an example of how directed link information may be organized. In general, the directed link information in data structure 700 is used in a process to determine a preferred route. In some cases, the directed link information in data structure 700 or portions of the directed link information in data structure 700 may be created and stored using data structure 700 during a process to determine a preferred route. This may be referred to as the dynamic generation of directed link information.

The directed link data structure 700 includes a directed link identifier 710, a speed 720, a distance 730, an enters-a-no-outlet-region indicator 740, a within-no-outlet indicator 750, an intersection cost for each directed-link-to-link transition 760, and an end node identifier 770. The directed link identifier 710 uniquely identifies a particular directed link. The speed 720 identifies an average speed for traversing the directed link. The distance 730 indicates the distance to traverse the directed link. Collectively, the speed 710 and the distance 730 may be used to determine a cost to traverse the directed link. Some implementations may include a cost in lieu of or in addition to the speed 720 and the distance 730. The enters-a-no-outlet-region indicator 740 identifies a directed link that enters a no-outlet region, as described previously with respect to FIGS. 3 and 5. The within-no-outlet indicator 750 indicates whether the directed link is located within a no-outlet region, as described previously with respect to FIGS. 3 and 5. The intersection cost for each directed link-to-link transition 760 includes an intersection cost for each alternative at an intersection. For example, the intersection cost may indicate a cost for proceeding straight through the intersection without turning, turning right at an intersection, and turning left at an intersection. The end node identifier 760 uniquely identifies the particular node that is the end node of the directed link.

Some implementations may include a start node identifier. The ability to traverse between node information, such as the node information that uses node information data structure 600 in FIG. 6, and directed link information, such as directed link information that uses directed link information data structure 700, may be useful in determining a preferred route. For example, a routing process may identify the directed links that are adjacent to a particular node, then identify the end node of a particular directed link, then identify the directed links from that end node, and so on.

Some implementations may use other software engineering techniques to identify a particular node and/or a particular directed link. For example, a geographic tiling method may be used in which a geographic region, such as the United States, is overlaid with a grid of blocks or tiles. Each tile may correspond to a portion of the geographic region and may be interlinked. For each tile, the latitude and longitude coordinates may be associated with a particular reference point of a tile (e.g., the lower left corner of a tile). A particular location (e.g., a particular node or a particular directed link) may be identified based on an association with a particular tile and the location of the particular location within the tile.

Figure 8:
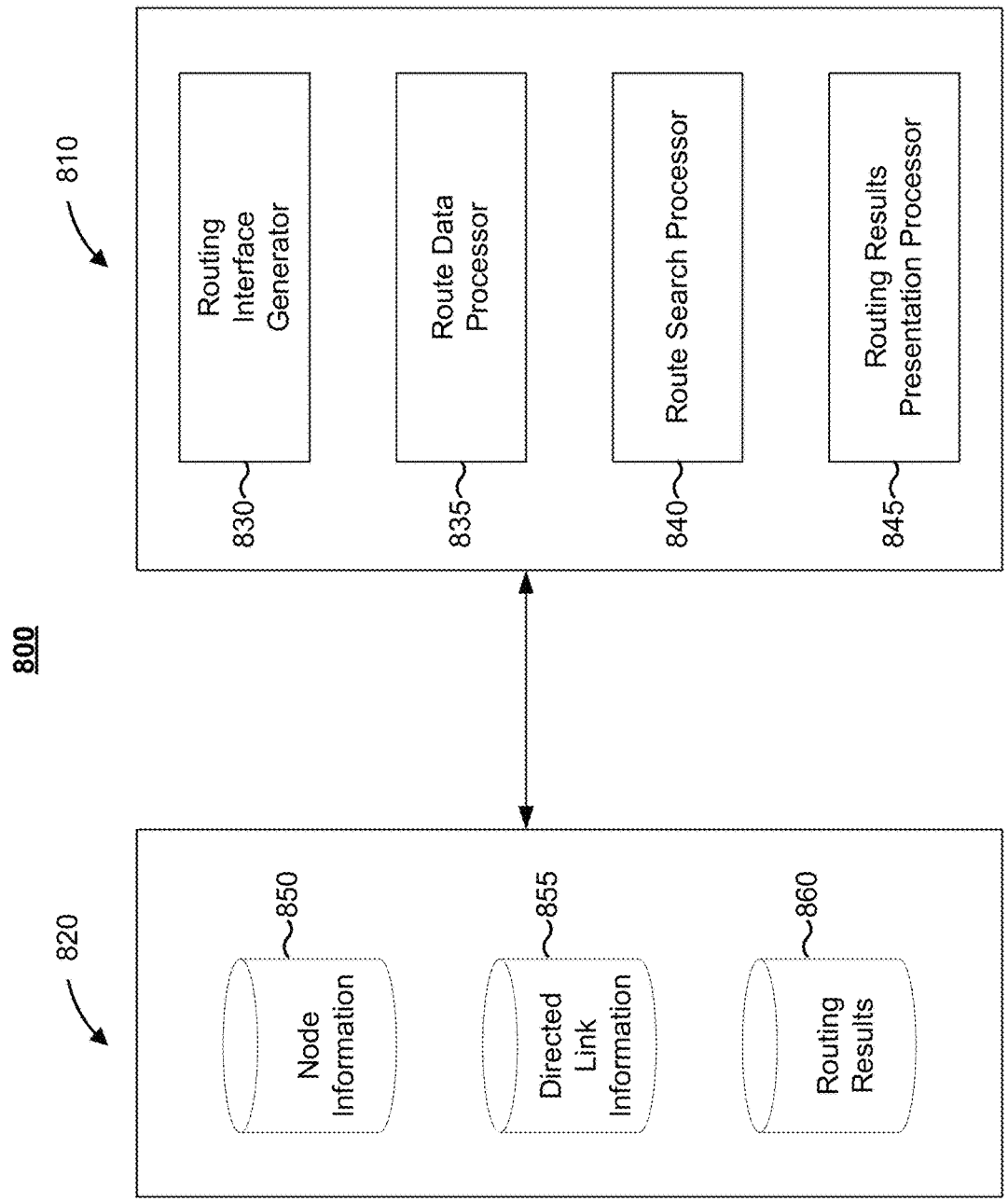
FIG. 8 is a diagram of components that may be used for determining a preferred route.

FIG. 8 depicts the components 800 that may be used in determining a preferred route. The routing system may be, for example, host system 110 of FIG. 1 or host system 210 of FIG. 2. The components 800 include processing components 810 and data components 820. The processing components 810 include routing interface generator 830, a route data processor 835, a route search processor 840, and a route results presentation processor 845. The data components include node information 850, directed link information 855, and routing results 860.

The routing interface generator 830 may generate a user interface for communicating with a user. For example, the user interface generated by the routing interface generator 830 may receive information from a user and initiate a process to determine a preferred route based on information received from a user. The information received may include an origin location, a destination location, or both. The information received also may include routing preferences, such as a preference for a rural route over an urban route.

The route data processor 835 may use geographic, road or other routing data to transform the routing data into node information 850 and directed link information 855 that may be used in determining a preferred route. Node information 855 may include information about particular nodes, such as the node information described with respect to FIG. 4 and the node information data structure 600 in FIG. 6. Directed link information 855 may include information about particular directed links, such as directed link information described with respect to FIG. 5 and the directed link data structure 700 in FIG. 7.

The route search processor 840 may direct and control the determination of a preferred route, such as described with respect to FIG. 4. The route search processor 840 may store the preferred route determined or other routing results in routing results 860. The route search processor 840 may provide the routing results to the routing-results-presentation processor 845. The routing results presentation processor 845 may present the routing results.

Figure 9:
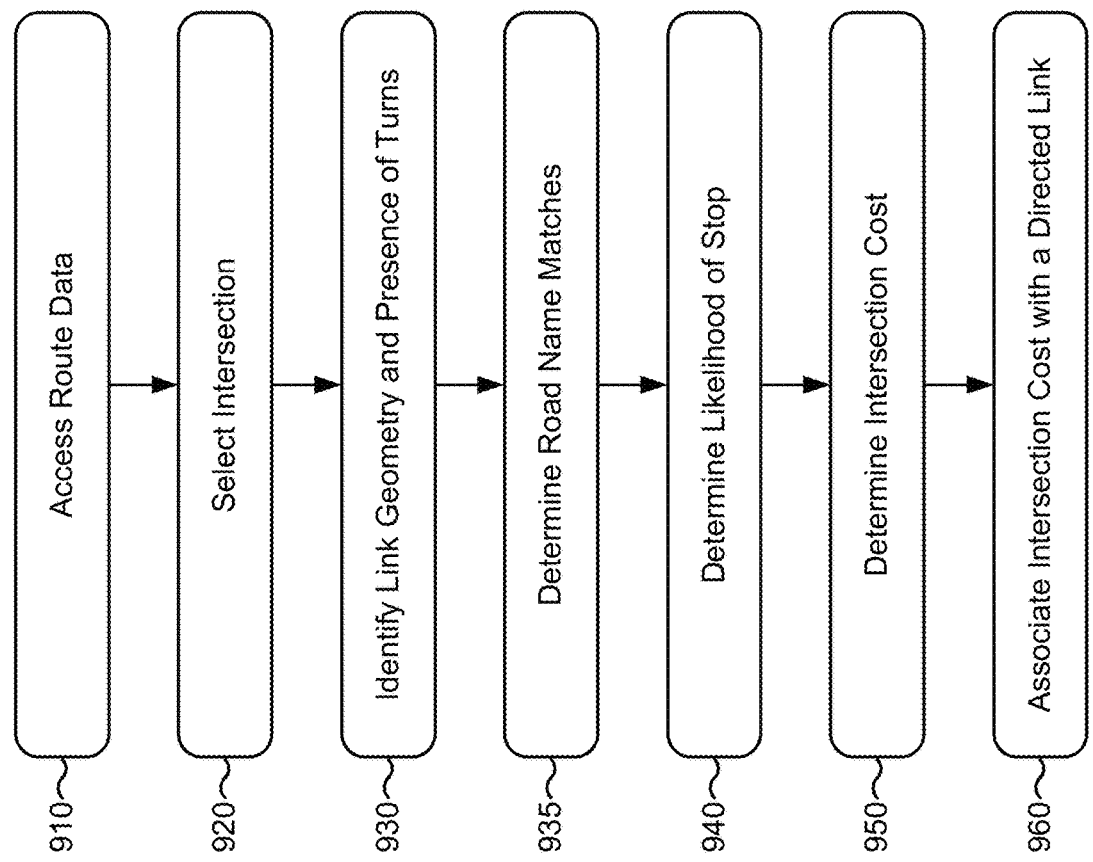
FIGS. 9 and 10 are flow charts illustrating processes that may be performed to determine a preferred route.

FIG. 9 illustrates a process 440 to determine an intersection cost and associate the intersection cost with a directed link. The process 440 may be performed on a predetermined or as-needed basis to determine intersection costs prior to or during the execution of a process to determine a particular preferred route. For example, the process 440 may be performed when new route network data is developed or received. Alternatively or additionally, the process 440 may be performed dynamically during a process to determine a preferred route. Intersection costs also may be referred to as turn costs. The process to determine a preferred route may be performed by a routing system, such as, for example, host system 110 of FIG. 1 or by host system 220 of FIG. 2.

In the process 440, the routing system accesses route data (step 910) and selects a particular intersection for which the intersection cost is to be determined (step 920). The routing system identifies the link geometry and the presence of turns (step 930). For example, the routing system determines whether a turn restriction is associated with a particular link-to-link transition. A link-to-link transitions may represent a particular turn in an intersection. An example of a turn restriction may include when a turn onto a one-way link or from a one-way link is prohibited. When a turn onto a one-way link is not prohibited, such a turn may be given a relatively high cost compared with other types of turns. Similarly, a simple U-turn may be prohibited or given a relatively high cost.

The routing system also may identify a false intersection. A false intersection may occur when a circumstance occurs (such as a road name change occurs or a turn is encountered) that typically is associated with an intersection but an intersection does not occur. For example, a false intersection may occur when a road crosses a state line or a county boundary. For a false intersection, the routing system may determine a cost based on whether a road name matches and/or the turn magnitude. For example, when a highway crosses a state boundary, the name of the road may not change and a sharp turn may not be associated with the link. A low cost or no cost may be associated with such an intersection. A false intersection that includes a sharp turn may be associated with a higher cost than a false intersection that does not include a sharp turn. A false intersection in which the names of the roads do not match may be associated with a so higher cost or a much higher cost than the false intersection of roads that have matching names.

The routing system may identify an intersection that proceeds to a ferry and associate a high cost to such an intersection.

One or more ramp-to-ramp transitions also may be identified and a cost may be associated with each type of ramp-to-ramp transition. A ramp-to-ramp transition may include the intersection of three ramps. This ramp-to-ramp transition may be associated with no cost or a low cost when the ramps continue without a sharp turn. When a sharp turn is included in a ramp, a low cost may be associated with the ramp. When there is a complex intersection of more than three ramps, a higher cost may be associated with the ramp-to-ramp transition than a ramp intersection including three ramps. A high cost may be associated with a ramp that crosses a road. A ramp that crosses a road may indicate a route that exits a highway and then re-enters the highway. Such a route generally is not a preferred route and a high intersection cost is associated with this case.

A simple merge from a ramp to a non-ramp (e.g., a road) may be identified and a cost may be associated with each transition from a ramp to a non-ramp. Some implementations may not identify an intersection cost associated with a simple merge from a ramp to a road and may only identify an intersection cost associated with a ramp that exits a highway. Alternatively, some implementations may identify an intersection cost associated with a simple merge from a ramp to a road and not identify an intersection cost associated with a ramp that exits a highway. The approach of associating an intersection cost only with a ramp that exits a highway or only with a ramp to a road may ensure that the route determination approach does not unduly penalize the use of a ramp. When an intersection cost is associated with a simple merge from a ramp to a road, the intersection cost associated may be higher when the simple merge includes a sharp turn than when the merge does not include a sharp turn.

Other types of ramp to non-ramp intersections that are not a simple merge may be identified, such as a "merge right" intersection, a "merge left" intersection, and a "merge cross" intersection. A "merge right" intersection in which a ramp to a non-ramp merge occurs when a road is located to the immediate right of the merge may be identified. The cost associated with a "merge right" intersection may be based on the road class type of the road. For example, a higher intersection cost may be associated with a "merge right" intersection when a state road is involved than when a local road is involved.

A "merge left" intersection in which a ramp to non-ramp merge occurs when a road is located to the immediate left of the merge may be identified. The cost associated with a "merge left" intersection may be based on the road class type of the road.

A "merge cross" intersection in which a ramp to non-ramp merge is not a simple merge and a road is not located to the immediate left or immediate right. The cost associated with a "merge cross" intersection may be based on the highest road class type at the intersection.

A transition from a non-ramp (e.g. a road) to a ramp may be identified and an intersection cost may be associated with the transition. A transition from a non-ramp to a ramp may be referred to as an exit. A simple exit may include three links in which the link adjacent to the other link is a ramp. The adjacent link may be referred to as a "to link." The other link may be referred to as a "from link." In a simple exit, the "from link" is one-way. The intersection cost associated with a simple exit that includes a sharp turn may be higher than the intersection cost associated with a simple exit that does not include a sharp turn.

Other types of non-ramp-to-ramp intersections that are not a simple exit may be identified, such as a "left exit" intersection, a "left exit from a one-way road" intersection, and an "exit crossing" intersection. A "left exit" intersection is an intersection in which the "to link" is a ramp to the immediate left and the "from link" is a two-way road. Generally, a route that uses a "left exit" intersection crosses a lane of traffic to make the turn. A higher cost may be associated with a "left exit" intersection than a simple exit intersection.

A "left exit from a one-way road" intersection is an intersection in which the "to link" is a ramp to the immediate left and the "from link" is a one-way road. The intersection cost associated with a "left exit from a one-way road" may be less than the "left exit" intersection cost.

An "exit crossing" intersection is an intersection in which the ramp is across a road that is of a road class type that is equal to or better than the road class type associated with the "from link." In such a case, a stop is highly probable and a substantial intersection cost may be associated with the exit crossing.

An intersection that includes a limited-access link to another limited-access link may be identified and an intersection cost may be associated with each link-to-link transition. A limited-access link is a road to which access is limited. Examples of a limited-access road includes a service road and a divided highway. An intersection of a merge of two divided highways is an example of a limited-access link to another limited-access link intersection. The intersection of a merge of two divided highways may be associated with a moderate intersection cost because traffic congestion may often occur at such a merge. A merge of two limited-access links in which neither of the names of the limited-access links match with the names of the links proceeding from the intersection may be associated with a substantial intersection cost.

An intersection that includes a limited-access link to a non-limited-access link may be identified and an intersection cost may be associated with the each link-to-link transition. When the names of the links at the intersection do not change, a low intersection cost may be associated with the transition. Such a transition may occur, for example, when a divided highway ends and the road continues as a single lane in each direction. When the names of the links at the intersection change, a moderate or substantial intersection cost may be associated with the transition. Such a transition may occur, for example, with a turn onto a service road or a U-turn.

An intersection that includes three links may be identified and an intersection cost may be associated with each link-to-link transition. When three links intersect, one link continues, and no name changes occur at the intersection, a low intersection cost is associated with the transition. When three links intersect, a road is on the immediate right or straight ahead through the intersection, the intersection cost associated with the transition is based on the stop level of the intersection (e.g., the difference between the road class type associated with each intersecting link). Similarly, when three links intersect, a road is on the immediate left or straight ahead through the intersection, the intersection cost associated with the transition is based on the stop level of the intersection (e.g., the difference between the road class type associated with each intersecting link). When three links intersect, a link is a ramp, and the intersection includes a link that does not have a matching name, a moderately high intersection cost is associated with the transition. When three links intersect, a road is on the immediate left, immediate right, or straight ahead thorough the intersection, the intersection cost associated with the transition is based on the stop level of the intersection plus a predetermined value. Typically, the predetermined value is the same or higher than the cost of intersection cost associated with a three-link intersection in which a non-matching name of a link occurs.

An intersection that includes four or more links may be identified and an intersection cost may be associated with each link-to-link transition in the intersection. The intersection cost associated with a right turn may be a predetermined value (e.g., 2) plus the stop level associated with the intersection. The intersection cost associated with the left turn may be a predetermined value (e.g., 4) plus the stop level associated with the intersection. The intersection cost associated with crossing the intersection (e.g., proceeding straight through the intersection without turning) may be a predetermined value (e.g., 3) plus the stop level associated with the intersection.

When a standard intersection includes the name change of one of the roads, typically a substantially higher intersection cost is associated with that link-to-link transition. For example, the intersection cost for a right turn may be a predetermined value (e.g., 10) plus the stop level associated with the intersection. The intersection cost for a left turn may be a predetermined value (e.g., 13) plus the stop level associated with the intersection. The intersection cost for crossing the intersection may be a predetermined value (e.g., 12) plus the stop level associated with the intersection.

The routing system determines road name matches (step 935). The routing system may determine whether the names of two roads on the opposite sides of an intersection of two or more roads match. When the names of two roads on opposite sites of an intersection do not match, a higher cost may be associated with the intersection than when the names of two roads on opposite sides of an intersection match. This may help reduce the number of maneuvers or turns performed in a determined route.

The routing system determines the likelihood of a stop (step 940). The routing system may determine the likelihood of a stop (e.g., a stop level) based on the types of roads that intersect. For example, the stop level of an intersection may be based on the intersection of two roads of differing road class type (e.g., an interstate, a U.S. highway, a state road, and a local road). A value may be assigned to each road class type. For example, a value of 2 may be associated with an interstate, a value of 4 may be associated with a U.S. highway, a value of 6 may be associated with a state road, and a value of 7 may be associated with a local road. A stop level may be determined by determining the difference between the value associated with the road class type of the "from link" with the value associated with the road class type of the "to link." In some implementations, the range of permitted stop level values may be limited (e.g., may range from −2 to +2).

The routing system determines an intersection cost (step 950). The determination may be based on the analysis performed in step 930, step 940, or other types of analysis. An intersection cost may be determined for each turn or link-to-link transition associated with a particular intersection.

The routing system associates the determined intersection cost with a directed link (step 960). For example, the intersection cost may be included in a directed link data structure, such as data structure 700 in FIG. 7.

Referring to FIG. 10, a routing system may use a process 450 to determine the directed links that enter a no-outlet region and the directed links that are within a no-outlet region for routing data. The process 450 may be performed on a predetermined or as-needed basis prior to the execution of a process to determine a particular preferred route. For example, the process 450 may be performed when new route network data is developed or received. Alternatively or additionally, the process may be performed dynamically during a process to determine a preferred route. The process to determine a preferred route may be performed by a routing system, such as, for example, host system 110 of FIG. 1 or host system 220 of FIG. 2.

The process 450 determines whether a particular directed link is a no-outlet link. The process may be applied to one or more directed links in routing data. The process 450 begins when a directed link is received (step 1010). The directed link that is received may be associated with a starting node (here, an origin node) and an ending node (here, a destination node). The routing system uses the routing data to determine whether two-way travel is permitted along the received link (step 1015). For example, the routing system may look-up the directed link in the routing data that identifies whether a particular road or directed link permits two-way travel. When the routing system determines that two-way travel is not permitted along the directed link, the routing system does not identify the directed link as a no-outlet link and the process 450 ends (step 1020). In some implementations, the directed link may be identified in one or more data structures, such as data structure 600, as a no-outlet link.

When the routing system determines that two-way travel is permitted along the directed link, the routing system determines whether the origin node (e.g., the starting node of the directed link) is a terminal node (step 1030). A terminal node is a node that connects to only one other node through a connection that is a two-way link. Two directed links connect a terminal node with the other node. One of the directed links includes the terminal node as a starting node, and the other directed link includes the terminal node as an end node. A link that connects with a terminal node may be a dead-end street or a cul-de-sac. Travel from the terminal node may not be restricted. When the routing system determines that the origin node of the directed link is a terminal node, the routing system does not identify the directed link as a no-outlet link and the process 450 ends (step 1020), as described previously.

When the routing system determines that the origin node of the directed link is not a terminal node, the routing system determines whether the destination node of the directed link is a terminal node (step 1040). If so, the routing system identifies the directed link as a no-outlet link and the process ends (step 1050). In general, travel to a terminal node may be restricted.

When the routing system determines that the destination node of the directed link is not a terminal node, the routing system performs a search from the destination node of the directed link to the origin node of the directed link (step 1070). Travel from the destination node to the origin node along the directed link is not permitted.

When the search finds the origin node (step 1080), the routing system does not identify the directed link as a no-outlet link and the process 450 ends (step 1020), as described previously. In such a case, an alternate path from the destination node to the origin node exists and the directed link is not a no-outlet link.

When the search is completed (e.g., no nodes remain that have not been searched) and the origin node has not been found (step 1090), the routing system identifies the directed link as a no-outlet link and the process ends (step 1050).

In some cases, the search may be terminated before the search is completed (step 1095). If so, the routing system does not identify the directed link as a no-outlet link and the process 450 ends (step 1020), as described previously. For example, a search may be terminated after searching for a predetermined length of time or after searching a predetermined number of nodes or links. The termination of a search at a certain point may be useful when searching a large number of links (e.g., a route graph that represents a road network that covers a large geographic region, such as a country or a state within a country). When a directed link exits from a no-outlet region, the entire route graph may need to be searched in step 1070 because there is no path back to the origin node (except for the disallowed link from the destination to the origin). The time required to search an entire route graph may be significant. The termination of the search at a certain point before completion may help improve the efficiency of the process 450.

When a directed link has been identified that enters a no-outlet region, the routing system traverses the network from the directed link that enters a no-outlet region to identify the directed links that are within a no-outlet region for routing data. In some implementations, the routing system may only identify the directed links that enter a no-outlet region.

Although FIGS. 1-10 illustrate systems and methods for determining a preferred driving route, the techniques are not limited to driving routes. These techniques may be applicable to determining a preferred route using other modes of transportation (e.g., walking, bicycling, flying, swimming, or navigating a water route). These techniques may be applicable, for example, to one or more computing devices for determining a preferred route that communicate in a client system and host system (e.g., an Internet access provider or an Internet service provider) relationship, a single computing device (e.g., with or without networking capabilities), or an embedded system (e.g., a navigation routing system in an automobile or other vehicle).

Implementations may include a method or process, an apparatus or system, or computer software on a computer medium. It is intended that various modifications may be made without departing from the spirit and scope of the following claims. For example, advantageous results still could be achieved if steps of the disclosed techniques were performed in a different order and/or if components in the disclosed systems were combined in a different manner and/or replaced or supplemented by other components. Other implementations are within the scope of the following claims.

What is claimed is:

1. A computer-implemented method, the method comprising:
   obtaining, by at least one processor of a navigation device, information associated with a routing graph representative of a road network,
       the routing graph comprising a plurality of nodes and one or more route links connecting pairs of the plurality of nodes,
           the plurality of nodes comprising an origin node and a destination node, and
           each route link, of the one or more route links, comprising route link data indicating whether each route link enters a no-outlet region;
   determining, by the at least one processor of the navigation device and based on the route link data, that a particular route link of the one or more route links enters the no-outlet region;
   determining, by the at least one processor of the navigation device and as a result of determining that the particular route link enters the no-outlet region, whether the destination node lies within the no-outlet region; and
   as a result of determining that the destination node does not lie within the no-outlet region:
       discontinuing, by the at least one processor of the navigation device, processing of the particular route link; or
   as a result of determining that the destination node lies within the no-outlet region:
       determining, by the at least one processor of the navigation device, a preferred route between the origin node and the destination node, and
       providing, by the at least one processor of the navigation device and for presentation on a display, information associated with the preferred route.

2. The computer-implemented method of claim 1, further comprising:
   selecting the particular route link based on one or more preferences of a user.

3. The computer-implemented method of claim 1, further comprising:
   selecting the particular route link based on a density of route links within a geographic region associated with the navigation device.

4. The computer-implemented method of claim 1, where the particular route link is a first route link, and
   where the computer-implemented method further comprises:
       identifying a second route link of the one or more route links based on determining that the destination node does not lie within the no-outlet region; and
       determining, based on route link data for the second route link, that the second route link enters another no-outlet region.

5. The computer-implemented method of claim 4, further comprising:
   determining whether the destination node lies within the no-outlet region based on determining that the second route link enters the no-outlet region; and
   generating the preferred route between the origin node and the destination node based on determining that the destination node lies within the no-outlet region including.

6. The computer-implemented method of claim 1, wherein at least one of the one or more route links corresponds to a road within the road network, and at least one of the one or more route links represents an intersection of roads within the road network.

7. The computer-implemented method of claim 1, further comprising:
   computing a cost for traversing the preferred route based on at least a cost for traversing the particular route link.

8. The computer-implemented method of claim 7, further comprising:
   obtaining information identifying a predetermined cost for traversing the particular route link; and
   computing the cost for traversing the preferred route based on at least the predetermined cost.

9. The computer-implemented method of claim 7, further comprising:
   identifying an intersection associated with the particular route link,
       the identified intersection corresponding to a node of the routing graph;
   determining an intersection cost associated with traversing the identified intersection based on at least one of:

a stop level associated with the intersection,
a waiting time associated with the stop level,
a road geometry associated with the intersection, or
a maneuver associated with the intersection; and
computing the cost associated with traversing the particular route link based on at least the determined intersection cost.

10. A navigation apparatus, comprising:
a storage device that stores a set of instructions; and
at least one processor to execute the set of instructions to:
obtain information associated with a routing graph representative of a road network,
the routing graph comprising a plurality of nodes and one or more route links connecting pairs of the plurality of nodes,
the plurality of nodes comprising an origin node and a destination node, and
each route link of the one or more route links comprising route link data indicating whether each route link enters a no-outlet region;
determine, based on the route link data, that a particular route link of the one or more route links enters the no-outlet region;
determine, as a result of determining that the particular route link enters the no-outlet region, whether the destination node lies within the no-outlet region; and
as a result of determining that the destination node does not lie within the no-outlet region:
discontinue processing of the particular route link; or
as a result of determining that the destination node lies within the no-outlet region:
determine a preferred route between the origin node and the destination node, and
provide, for presentation on a display, information associated with the preferred route.

11. The navigation apparatus of claim 10, wherein the at least one processor is further to:
generate an electronic instruction to transmit information identifying at least the preferred route to a device of a user.

12. The navigation apparatus of claim 11, wherein the at least one processor is further to:
select the particular route link based on one or more preferences of the user.

13. The navigation apparatus of claim 11, wherein the at least one processor is further to:
select the particular route link based on a density of route links within a geographic region associated with the device.

14. The navigation apparatus of claim 10, wherein the particular route link is a first route link, and
wherein the at least one processor is further to:
identify a second route link of the one or more route links from the routing graph based on determining that the destination node does not lie within the no-outlet region;
determine, based on route link data for the second route link, that the second route link enters another no-outlet region;
determine whether the destination node lies within the other no-outlet region based on determining that the second route link enters the other no-outlet region; and
generate the preferred route based on determining that the destination node lies within the other no-outlet region.

15. The navigation apparatus of claim 10, wherein at least one of the one or more route links corresponds to a road within the road network, and at least one of the one or more route links represents an intersection of roads within the road network.

16. The navigation apparatus of claim 10, wherein the at least one processor is further to:
compute a cost for traversing the preferred route based on at least a cost for traversing the particular route link.

17. The navigation apparatus of claim 16, wherein the at least one processor is further to:
obtain information identifying a predetermined cost for traversing the particular route link; and
compute the cost for traversing the preferred route based on at least the predetermined cost.

18. The navigation apparatus of claim 17, wherein the at least one processor is further to:
identify an intersection associated with the particular route link,
the identified intersection corresponding to a node of the routing graph;
determine an intersection cost associated with traversing the identified intersection based on at least one of:
a stop level associated with the intersection,
a waiting time associated with the stop level,
a road geometry associated with the intersection, or
a maneuver associated with the intersection; and
compute the cost associated with traversing the particular route link based on at least the determined intersection cost.

19. A non-transitory computer-readable medium storing instructions, the instructions comprising:
one or more instructions that, when executed by at least one processor, cause the at least one processor to:
obtain information associated with a routing graph representative of a road network,
the routing graph comprising a plurality of nodes and one or more route links connecting pairs of the plurality of nodes,
the plurality of nodes comprising an origin node and a destination node, and
each route link comprising route link data indicating whether each route link enters a no-outlet region;
determine, based on the route link data, that a particular route link of the one or more route links enters the no-outlet region;
determine, as a result of determining that the particular route link enters the no-outlet region, whether the destination node lies within the no-outlet region; and
as a result of determining that the destination node does not lie within the no-outlet region:
discontinue processing of the particular route link; or
as a result of determining that the destination node lies within the no-outlet region:
determine a preferred route between the origin node and the destination node, and
provide, for presentation on a display, information associated with the preferred route.

20. The computer-implemented method of claim 1, further comprising:
determining whether two-way travel is permitted along the particular route link, and
determining whether the origin node is a terminal node based on two-way travel being permitted along the particular route link.

21. The navigation apparatus of claim 10, wherein the at least one processor is further to:
generate the route link data indicating whether the particular route link enters the no-outlet region by:
determining whether two-way travel is permitted along the particular route link; and
determining whether the origin node is a terminal node based on two-way travel being permitted along the particular route link.

\* \* \* \* \*